(12) United States Patent
Matsunaga

(10) Patent No.: US 11,842,348 B2
(45) Date of Patent: Dec. 12, 2023

(54) DATA MANAGEMENT SYSTEM AND DATA MANAGEMENT METHOD

(71) Applicant: Chikara Matsunaga, Hyogo (JP)

(72) Inventor: Chikara Matsunaga, Hyogo (JP)

( * ) Notice: Subject to any disclaimer, the term of this patent is extended or adjusted under 35 U.S.C. 154(b) by 0 days.

(21) Appl. No.: 17/055,413

(22) PCT Filed: May 17, 2018

(86) PCT No.: PCT/JP2018/019049
§ 371 (c)(1),
(2) Date: Nov. 13, 2020

(87) PCT Pub. No.: WO2019/087443
PCT Pub. Date: May 9, 2019

(65) Prior Publication Data
US 2021/0150045 A1    May 20, 2021

(30) Foreign Application Priority Data

Nov. 2, 2017 (WO) .................. PCT/JP2017/039703

(51) Int. Cl.
*G06Q 20/40* (2012.01)
*G06F 21/32* (2013.01)
(Continued)

(52) U.S. Cl.
CPC ....... *G06Q 20/40145* (2013.01); *B60W 40/09* (2013.01); *G06F 21/32* (2013.01);
(Continued)

(58) Field of Classification Search
CPC ...... B60W 40/09; G06F 21/32; G06F 21/602; G06F 21/6218; G06F 21/78;
(Continued)

(56) References Cited

U.S. PATENT DOCUMENTS 5,751,287 A * 5/1998 Hahn .................... G06F 3/0481
715/775
6,166,716 A * 12/2000 Kashino ................. G09G 5/377
726/19
(Continued)

FOREIGN PATENT DOCUMENTS

| JP | H11-195033 | 7/1999 |
| JP | 2006-277193 | 10/2006 |
| JP | 2007-207036 | 8/2007 |
| JP | 2017-084039 | 5/2017 |

OTHER PUBLICATIONS

International Search Report of PCT/JP2018/019049, dated Aug. 7, 2018, 5 pages including English translation.

*Primary Examiner* — Han Yang
(74) *Attorney, Agent, or Firm* — Hamre, Schumann, Mueller & Larson, P.C.

(57) ABSTRACT

To provide an application in which security settings for verifying that input content and operation content are correct are set not only when opening an application file but also when terminating and closing the application file, thereby effectively reducing erroneous input unauthorized input. A data management system of the present invention includes: a data access unit open program module in which an open secret code for opening each data access unit by the application program and a close secret code for closing each data access unit that is opened by the application program are set for each data access unit. When the authentication of the open secret code is established, corresponding data access unit are downloaded in an encrypted state, decrypted and opened. When the authentication of the close secret code is established, the data access unit in the open state is terminated, re-encrypted and closed.

15 Claims, 21 Drawing Sheets

(51) Int. Cl.
  *G06F 21/60* (2013.01)
  *G06F 21/62* (2013.01)
  *G06F 21/78* (2013.01)
  *B60W 40/09* (2012.01)
  *G07C 5/08* (2006.01)
  *G07C 9/00* (2020.01)

(52) U.S. Cl.
  CPC ........ *G06F 21/602* (2013.01); *G06F 21/6218* (2013.01); *G06F 21/78* (2013.01); *G06Q 20/4012* (2013.01); *G07C 5/085* (2013.01); *G07C 9/00309* (2013.01); *G07C 2009/00388* (2013.01)

(58) Field of Classification Search
  CPC ........ G06Q 20/40145; G06Q 20/4012; G07C 5/085; G07C 9/00309; G07C 2009/00388; H04L 63/0861; H04W 4/40; H04W 12/06
  See application file for complete search history.

(56) References Cited

U.S. PATENT DOCUMENTS

| | | | |
|---|---|---|---|
| 9,485,098 B1* | 11/2016 | Lepeshenkov | H04L 9/0866 |
| 2007/0192871 A1* | 8/2007 | Kamekawa | H04N 1/2191 |
| | | | 715/234 |
| 2011/0240748 A1* | 10/2011 | Doughty | G07F 7/0806 |
| | | | 235/492 |
| 2012/0284298 A1* | 11/2012 | Mason | G06Q 10/06 |
| | | | 707/769 |
| 2015/0106626 A1* | 4/2015 | Kremp | H04L 63/06 |
| | | | 713/189 |
| 2018/0121666 A1* | 5/2018 | Tokuyama | G06F 21/602 |
| 2020/0211119 A1* | 7/2020 | Matsunaga | G06Q 10/10 |
| 2021/0006553 A1* | 1/2021 | Matsunaga | G06F 21/604 |
| 2021/0056556 A1* | 2/2021 | Matsunaga | G06Q 20/40145 |
| 2021/0342422 A1* | 11/2021 | Matsunaga | G06F 21/31 |
| 2021/0357928 A1* | 11/2021 | Matsunaga | H04L 9/3247 |
| 2022/0084331 A1* | 3/2022 | Matsunaga | G06Q 20/4012 |

* cited by examiner

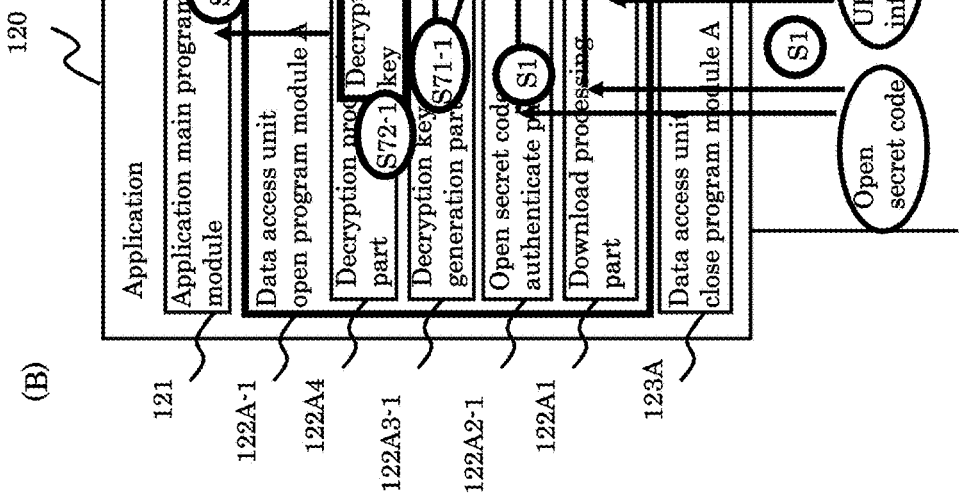
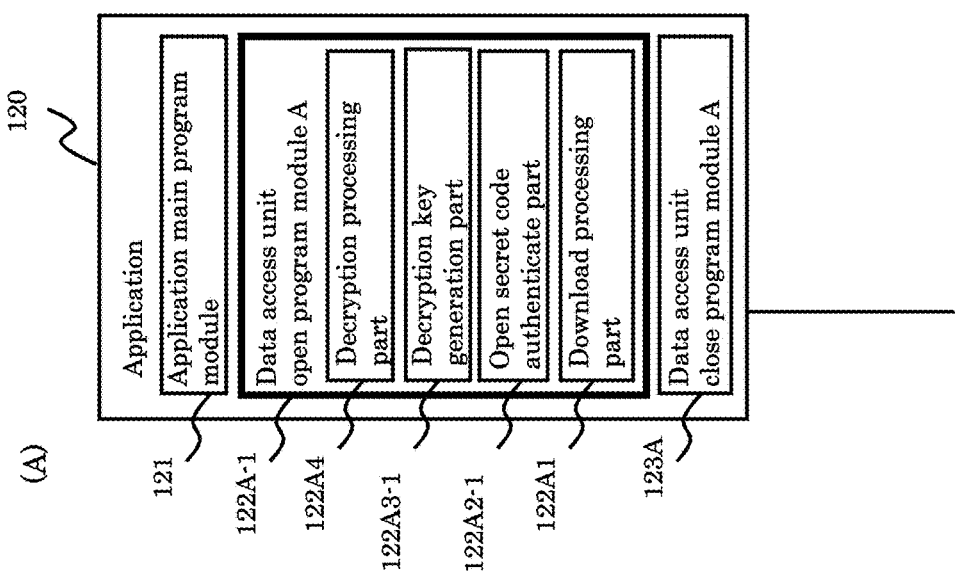
Fig.6

(A)
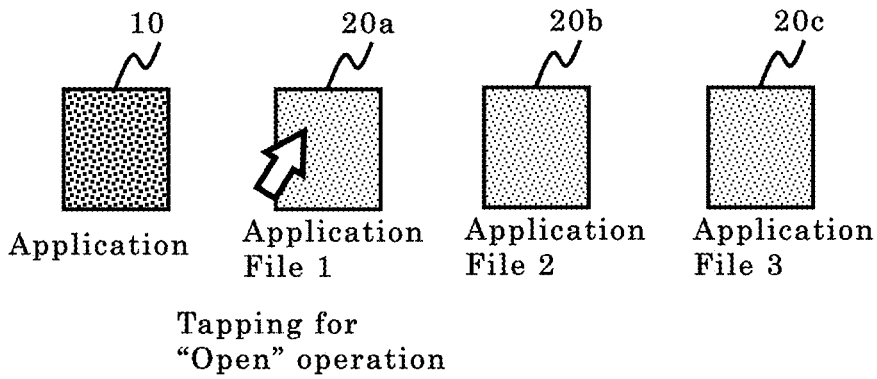
(B)
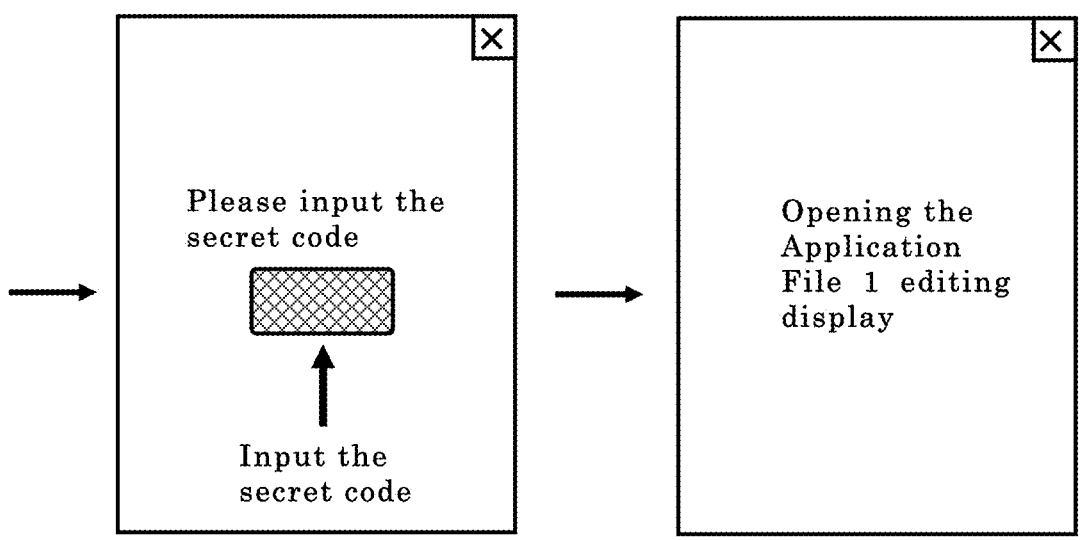
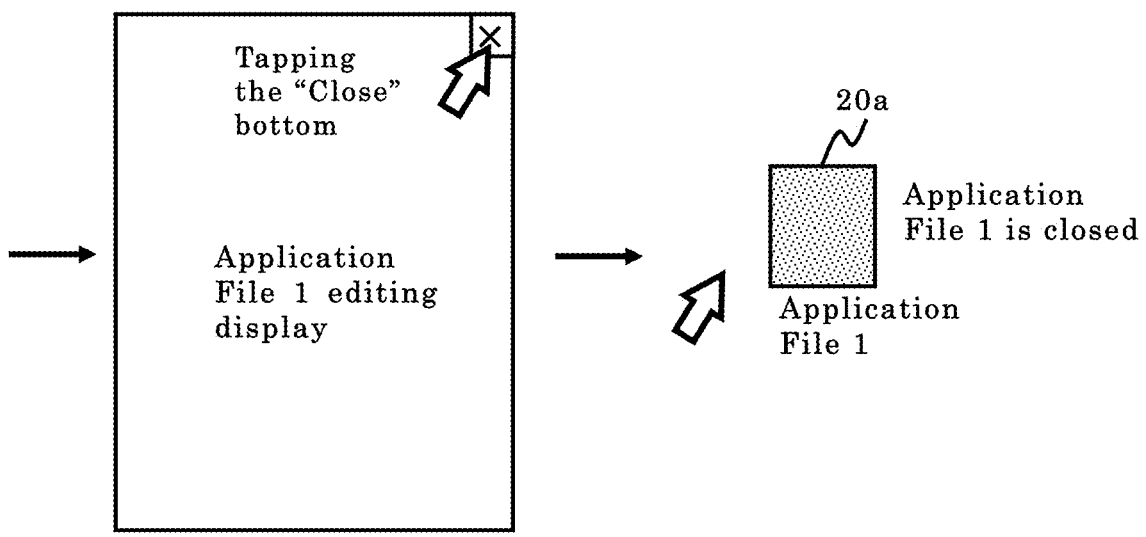
Fig.21

DATA MANAGEMENT SYSTEM AND DATA MANAGEMENT METHOD

TECHNICAL FIELD

The present invention relates to a data management system which is accessed by an application running in a computer system, manages a data access unit serving as a unit of browsing, output, or editing, and controls various operations to the data access unit by the application for browsing, output, and editing.

The data access unit includes an application file, a record, a field, etc. The data access unit is normally opened to start the use, and it is ensured that the data access unit is normally closed. Applications are not limited and can be applied to various uses.

BACKGROUND ART

In a computer system, various applications are operating, and various security measures are taken for access to the application file.

The meaning of security measures is wide. For example, the person who can access the application file used in the application is limited to only an authorized person so that the application file can be used only by the authorized person, a measures for inputting a predetermined code information are widely adopted when the application file is accessed and opened. According to the security level, a password is simply inputted from the keyboard, or the ID information is inputted from the IC card carried with the password, and biological information such as a fingerprint, a vein pattern or the like is inputted. In addition, the security system requires not only one person but also the plurality of authorized persons for cooperating to input the password, ID information, etc. to open the user application file. In such manner, high security is set to make the application file in an operative state when opening stage.

Also, security measures by encryption are also effective. That is, even when unauthorized access to data by a person other than the authorized person is performed, the data are encrypted so that the data are not readable state. Only the authorized person has a decryption key, and the data can be decoded by the decryption key.

When the application is activated and the application file is opened in an operable state, the user can edit the application file by using the application. When a special program module is used during the operation of the application, a password, ID information, or the like may be requested separately.

In this way, when the application file is opened or a special program module is used, security may be set. However, on the contrary, when the application is finished and the application file is closed or when the use of the special program module is finished, no special security such as input of password or ID information or the like is required for performing the security. Most of the application and the application file can be simply finished and ended by input of an "end" command or click the "closing" button.

FIG. 21 is a schematic view showing the operation of the general application for starting and opening the application file, using, then closing. It is an example showing the typical operation for opening and closing the application file.

As shown in FIG. 21 (A), application 10 is installed to the computer system. When the user starts to use the application 10, the user selects the icon of the application 10 displaying onto the monitor by the pointing device such as mouse. With the user input application file open command by the double click operation, the application 10 is started.

In this case, several application files such as 20a, 20b, 20c that can be operated by the application 10 are installed to the computer system, and the corresponding icons are displayed on the monitor. The user selects the icon of the application file 20 by the pointing device such as a mouse and conducts the double click operation, and the selected application file 20 is opened by the application 10. The application file 20 is opened by the application 10 to be operable, and current data contents are displayed onto the monitor.

If the application file 20 has a security measure for requesting password input, a password input column pops-up for confirming the use authority as shown in the upper figure of FIG. 21 (B). As shown above, password input may be requested if the user starts application 10 and opens application file 20 for operating in the prior art. If higher security is combined, the input of the identification information from IC card and the input of the biological information are requested besides the password input.

As shown in the upper figure of FIG. 21 (B), if the user inputs requested password and code information for opening the application file 20 via keyboard or other input devices, and the authentication process is identified successfully to fulfill the requested security level, the application file 20 is opened normally.

Next, as shown in the lower figure of FIG. 21 (B), when the user finishes the desired operation through the application file 20, the user can simply close the application file 20 by pushing the command button or the pull-down menu such as "End button" and "Close button" with the pointing device such as a mouse. The application 10 and the application file 20 are simply finished and closed normally.

The conventional application 10 does not request any input for special password and ID information when closing the application file 20. The conventional application 10 finishes simply and closes the application file 20 simply.

As shown above, when accessing the application file 20, various information input is requested according to the employed security level for confirming the authentication of the user at the opening of the application file 20. However, once the authentication check is conducted at the opening event, it is assumed that the right person who satisfied authentication keeps on using under his authentication, and the finishing operation and closing operation of the application file 20 is conducted under his authentication. Therefore, the conventional application 10 does not request any special input of the password and ID information at the closing operation of the application file 20. Of course, there is a possibility that the application 10 and application file 20 faces a forced termination abnormally by becoming inoperable due to some operation error or system error. However, when the operation reaches the end normally without any operation error nor system error, the application 10 can be simply finished and the application file 20 can be simply closed in the prior art.

Recently, the applications and application files connected via the network and service processing systems that are organized by plural computer systems via network are widely spread in addition to the conventional stand-alone type computer system. However, the operation and processing for starting the application 10, opening the application file 20, use and finishing the application 10 and closing the application file 20 are the same those of the stand-alone computer system as shown above. The network system requests the security for inputting code information such as password and ID information when the user logging-in the network system and opening the application file 20 via the network. However, the conventional network system does not request the security for inputting any code information such as password and ID information when logging-off the network system and closing the application file 20 via the network. The user can simply close the conventional application file 20 via the conventional network system.

When security measures are taken by encryption, only an authorized person has the decryption key, the application file 20 can be decoded by the decryption key in access to the application file 20, and the application file 20 is decoded to a normal data state operable by the application 10. After the application 10 is used to perform operation, data editing, update, etc., then the application file 20 is closed. When the application file 20 is closed, no special password or input of ID information is required in the prior art. The user encrypts the application file 20 and then user only presses a closing button, the application file 20 is simply finished and automatically closed.

Prior art 1: JP 2006-277193

DISCLOSURE OF THE INVENTION

The Problems to be Solved

In the prior application, when the user who has opened the application file is truly the authorized person, the input content and the operation content during the editing of the application file are valid, the application file is closed as it is, and the application is terminated without any problem as a normal operation. Therefore, it is not necessary to take a security measure such as an input of a special password when the application 10 is finished and the application file 20 is closed.

However, when the application 10 is finished and the application file 20 is closed, there may be a request to confirm the security whether or not the input data to the application file for reflecting the data content and the operation content by the true authorized person before finish and close.

The input contents and the operation contents inputted during the editing of the application file can be the wrong contents due to the misunderstanding or error by the user, or the case where the contents are intentionally different from the fact by the fraudulence of the user. In this way, it is a problem that the resulting data in the application file is created by wrong contents different from the fact, and the wrong data is stored as a result edited through the application 10, and the wrong data is transmitted to the other system via the network.

In general, whether the input contents and operation contents of the data in the application file 20 created by using the application are correct without errors can be checked by checking the contents of the result data itself. It is possible to confirm that the third-party checks and there is no error in the input contents and the operation contents inputted to the application file 20. However, it is better to require the confirmation that the result data is correct or not by the third-party as a close condition at the end of the application. The result data is confirmed by the third-party at ending stage of the application file that the result data is created with the correct content, and the possibility that the user's misunderstanding or error and the illegal use of the user are different from the fact is reduced.

The requirement of the application in which the security level is set at the end of editing of the application file is applicable in various fields.

If the application file 20 is managed in a storage device in a data server installed in an accessible configuration on a network and the application file 20 is a personal data file including personal information of a user, large problem can be caused by the data leakage by unauthorized access. In fact, in the past, illegal access to a mail order site system, an SNS system, etc. has caused a large-scale incident of personal data leakage from thousands to tens of millions of users.

Since the management operator needs access to the personal data of the user for operation in the mail order site system and the SNS system or the like, the personal data are stored as they are on the storage device of the system. To block the unauthorized access from the outside, the security for checking whether the access person is a correct person having a valid access right is performed only by a password or the like as described above.

Regarding the security measure for encryption, it is considered that encryption for the data used in the mail order site system and the SNS system, etc. is not employed. It is because that data operations such as writing and updating are frequently performed in such system and the user is unable to decrypt the decryption key so as not to be decoded. However, there are needs for the users to utilize encryption processing on the storage device of the management system for improving the security level of his/her own personal data.

In order to achieve the above-mentioned object, the present invention, not only when the application file is opened but also even when the application file is finished and closed, provides a data management system which performs security setting for confirming correct input contents, and effectively reduces erroneous input based on errors due to misunderstanding or error, and illegal input different from the fact, and makes it impossible to read individual personal data even when personal data are leaked from the storage device of the management system by the encryption processing by the user himself/herself.

Means for Solving the Problems

In order to achieve the above-mentioned object, a data management system comprises: an application program that can be used in a computer system; a code input device; a data access unit; a storage device on a network in which a plurality of data access units are stored; a data access unit open program module; and a data access unit close program module.

The data access unit is accessed by the application program as a unit of browsing, output or editing. The data access unit includes an open secret code for browsing, outputting, or editing to each data access unit, and a close secret code for normally ending the application program for browsing, outputting, or editing to each data access unit.

The storage device on a network stores a plurality of data access units in a state in which all or at least a selected part is encrypted.

For example, the storage device is managed by a data server storing a plurality of data access units. According to its specification, personal data of several tens to hundreds of billion persons can be stored and managed.

A variety of networks such as the Internet, an intranet and a LAN can be assumed as the network.

The data access unit open program module is a program module of downloading, decrypting, outputting, or editing the data access unit in an encrypted state based on the authentication of the open secret code for each data access unit targeted by the application.

The data access unit close program module is a program module of normally ending the browsing, outputting, or editing of the data access unit based on the authentication of the close secret code inputted through the code input device, re-encrypting and closing the data access unit and uploading it to the corresponding storage device.

The concept of data access unit may include an application file handled by an application, a record in a database handled by the application, a field of a record in the database, and the like. Since access can be performed by these as a unit.

The encryption key and the decryption key may be of a type that dynamically generates, and a type that uses a stored key in the user computer system.

For the dynamically generated type, the decryption key is the open secret code itself or generates a decryption key from the inputted open secret code. In this case, the encrypted state for each data access unit is encrypted that the open secret code becomes the decryption key at the time of opening, decrypting of the data access unit.

The type utilizing the data stored in the user computer system is provided with a decryption key storage unit for storing a decryption key for the data access unit in the encrypted state, and extracts the decryption key from the decryption key storage unit on the basis of the authentication of the open secret code. In this case, the encrypted state for each data access unit stored in the storage device is encrypted so as to be decrypted with the stored decryption key.

With this configuration, the data management system of the present invention is not only authenticated by the open secret code when the data access unit is opened, but also performs security setting for obtaining the input of the close secret code even when the access to the data access unit, the output and the editing are finished, and the input content and the operation content are correct. In addition, the decryption processing is automatically executed with the decryption of the data access unit at the time of opening, and the encryption processing is automatically executed even with the encryption at the time of closing.

The storage device is installed on a data server of different computer resources from the computer system in which the application is installed, and automatically processes encryption and decryption as described above. All or at least a selected part of the data access unit is stored in the encrypted state at all times, and only when the data access unit is downloaded to the computer system of the user via the network is the data access unit in a decrypted state. When the operation by the close program module is executed, the data access unit is again encrypted and uploaded to the storage device via the network in the re-encrypted form.

Thus, in the storage device, the data access unit is stored in an encrypted state at all times. Therefore, even if there is data leakage from the storage device due to unauthorized access, the data is in encrypted state, so the personal information of the user cannot be read, and substantial data leakage damage can be prevented.

It is preferable that the open secret code and the close secret code given for each data access unit are unique for each data access unit. If the open secret code and the close secret code are common for a plurality of data access units, if there is leakage of data by unauthorized access, the common open secret code and the close secret code may be used to attempt decrypting of the data. When the open secret code and the close secret code given for each individual data access unit are different from each other, there is no possibility of damage by being decrypted to a large scale even when there is data leakage by unauthorized access.

In particular, biological information of the user individual is used for the open secret code and the close secret code, and the code input device is a read device of biological information, it is convenient for the user, and security is improved because the code information is unique for each user. The open secret code and the close secret code can be the same. For example, the open secret code can also be a fingerprint pattern of the forefinger of the right hand. In addition, the open secret code and the close secret code can be made different. For example, the open secret code can be a face image pattern, and a close secret code can be a different kind of biological information such as a voiceprint pattern.

The code information consisting of a combination of numerals and alphabets is inputted as the open secret code, and different code information consisting of a combination of numerals and alphabets may be inputted as a closed secret code.

Next, the data management system of the present invention can cope with a browsing, an outputting, and an editing executor different from an owner of the individual data access unit.

The owner of each data access unit is provided with an authority setting program module enabling authority setting of which execution content is permitted to the executor of browsing, outputting, and editing. The owner of an individual data access unit (for example, the individual being an owner of personal data) is opened by an open program module, and a person who wants to access personal data such as browsing, outputting, and editing (a person who wants to access personal data such as an administrative party, a financial person or a medical person) can be operated to perform browsing, outputting, and editing on the basis of the set authority.

The browsing allows the person authorized by the user to view data access unit displayed on a user computer system.

The outputting may include outputting the data access unit to the printer or outputting it in the form of a PDF file or outputting data to the projector.

The editing may add the data itself of the data access unit, partially delete, or partially rewrite the data. It is also possible to store the edited data in a storage device.

An example of a business system to which the application of the present invention is applied is a wide variety of applications, and applications are not particularly limited. The application can be widely applied as a business system related to the business if the application has the open program module for a data access unit and a close program module to the data access unit in addition to business-related program modules.

After the owner of the data access unit can operate the data access unit by the open program module, the use of the business-related program module becomes available, and when the business-related program module ends, the owner of the data access unit normally terminates the data access unit by the close program module.

A higher security level can be secured by setting a security operation such as the input of a secret code corresponding to each operation step to an application file, a record in the database, or a field of a record in the database such as; selecting step of an application file, a record in the database, or a field of a record in the database for activation; opening step of the application file, the record in the database, or the field of the record of the database on which the start instruction is applied; and closing step of the application file, the record in the database, or the field of the record in the database.

It should be noted that the setting of the security operation such as the secret code input in any stage is not limited to all the steps, but some of them may be set. For example, two steps of opening and closing the application file, the record in the database and the field of the record in the database may be performed in three stages: a step of selecting and starting the application file, the record in the database or the field of the record in the database; and a step of opening the application file, the record in the database or the field of the record in the database and a step of closing the application file, the record in the database or the field of the record in the database.

Then, the data owner of the data access unit can select whether or not the data owner of the data access unit recognizes the use as big data for each data access unit.

A data management system according to the present invention is provided with an encryption selection unit capable of selecting a portion to be encrypted among data in an application file when the data access unit is an application file. With respect to a data part in an application file in which encryption is not selected by the encryption selection part, the management subject of the data server for managing the storage device can be browsed or used as the data of the big data.

Also, in the data management system of the present invention, when the data access unit is a record unit, the encryption selection unit for selecting a field to be encrypted out of the fields of the record is provided. For data of a field in which encryption is not selected by the encryption selection part, it is possible to use the management subject of the data server for managing the storage device can be browsed or used as the data of the big data.

Next, in the data management system of the present invention, as a device for improving the security strength, a data access unit is decomposed, and a plurality of encrypted pieces of encrypted decomposition pieces are used to be distributed and stored on a network.

The data access unit close program module decomposes a data access unit normally finished by receiving an input of the close secret code into a plurality of pieces to form individual decomposition pieces, and further has a plurality of encrypted decomposition pieces each encrypted with the decomposition pieces. A plurality of storage devices distributed and arranged on a network are used as a storage device. These individual encryption decomposition pieces are distributed and stored in these storage device distributed and arranged on a network.

In operation, the user does not need to be conscious of distributed storage. The data access unit open program module has a URL conversion program module. The URL conversion program module converts the distributed ID information and URL information to a plurality of storage devices actually stored based on nominal ID information and URL information given when assuming that the data access unit is not decomposed and in single storage.

By using the URL conversion program module, each encryption decomposition piece is downloaded based on the converted ID information and URL information on the distribution obtained on the basis of the nominal ID information and URL information, and the one or more pieces of encrypted decomposition pieces are composed, decrypted, outputted, or edited as an integrated data access unit. In the upload of the data access unit by the data access unit close program module, based on the plurality of distributed ID information and URL information, each of the plurality of encrypted decomposition pieces is distributed and stored in the actual plurality of storage devices.

With this configuration, the user decomposes the data access unit without being conscious of distributed storage in the network, makes the encrypted plurality of encrypted decomposition pieces as encrypted decomposition pieces, distributed and stored on the network. It is possible to enhance the security for preventing the data access unit from being decrypted even if a certain data server on the network is illegally accessed.

In a data management method according to the present invention, the open secret code, a plurality of data access units are stored in the storage device on the network in a state in which all or at least a selected portion is encrypted for each data access unit, the data access unit in the encrypted state is downloaded and decrypted on the basis of the open secret code inputted to the data access unit targeted by the application; a data access unit open process for enabling output or editing; and a data access unit close process for normally terminating the browsing, outputting, or editing of the data access unit by the application on the basis of the inputted close secret code, encrypting and closing the data access unit, and uploading the data to the corresponding storage device.

The Effect of the Invention

In this data management system, the authentication of the open secret code is required when the data access unit is opened. After the browsing of the data access unit, the output, and the editing, the close secret code is required when the data access unit is closed. The security setting is made possible by those authentication stages for the user, and the user can confirm that the input content and the operation content are correct. In addition, the decryption processing is automatically executed so that the open secret code becomes the decryption key at the time of opening, decoding of the data access unit by the open secret code as the decryption key is processed, and the encrypted data access unit can be opened. The encryption processing is automatically executed so that the close secret code becomes the encryption key at the time of closing.

Because the storage device used by the data server is configured on the data server as a computer resources different from the user computer system to be accessed, each data access unit processes switching encryption state and decryption state by the abovementioned automatically processing, the data access unit can be stored in the encrypted state at all times in the storage device, even if there is leakage incident of data by unauthorized access, the data is always encrypted, so that substantial data leakage damage can be prevented because the user's personal information or the like is not easily decrypted.

The data management system of the present invention can cope with the case that the person operating browsing, output, editing is different from the person of the owner of the individual data access unit. The system configuration is provided with an authority setting control program module, the authority setting control can be possible in which execution content browsing, output and editing is permitted to the management person and the user on the basis of the set authority.

BRIEF DESCRIPTION OF THE DRAWINGS

FIG. 6(A)-(B) is a schematic view showing the configuration and processing flow (1) of an application 120, especially, the data access unit open program module 122A.

FIG. 21(A)-(B) is a schematic view showing an operation outline of a conventional general application.

DETAILED DESCRIPTION OF THE PREFERRED EMBODIMENT

Some embodiments of the data management system according to the present invention are described below with reference to the relevant drawing. Needless to add, the claims of the present invention include but are not limited to the configuration shown in the following embodiments.

Hereinafter, the example of the data management system and the basic operation of the present invention are described in Embodiment 1 and 2.

Embodiment 1 shows an example of the basic system configuration.

Embodiment 2 shows an example of the system configuration employing the data access unit 131 is the encrypted decomposition piece, which are stored in the plural distributed data storages on the network.

Embodiment 1

The data management system 100 of the present invention of Embodiment 1 is described.

Figure 1:
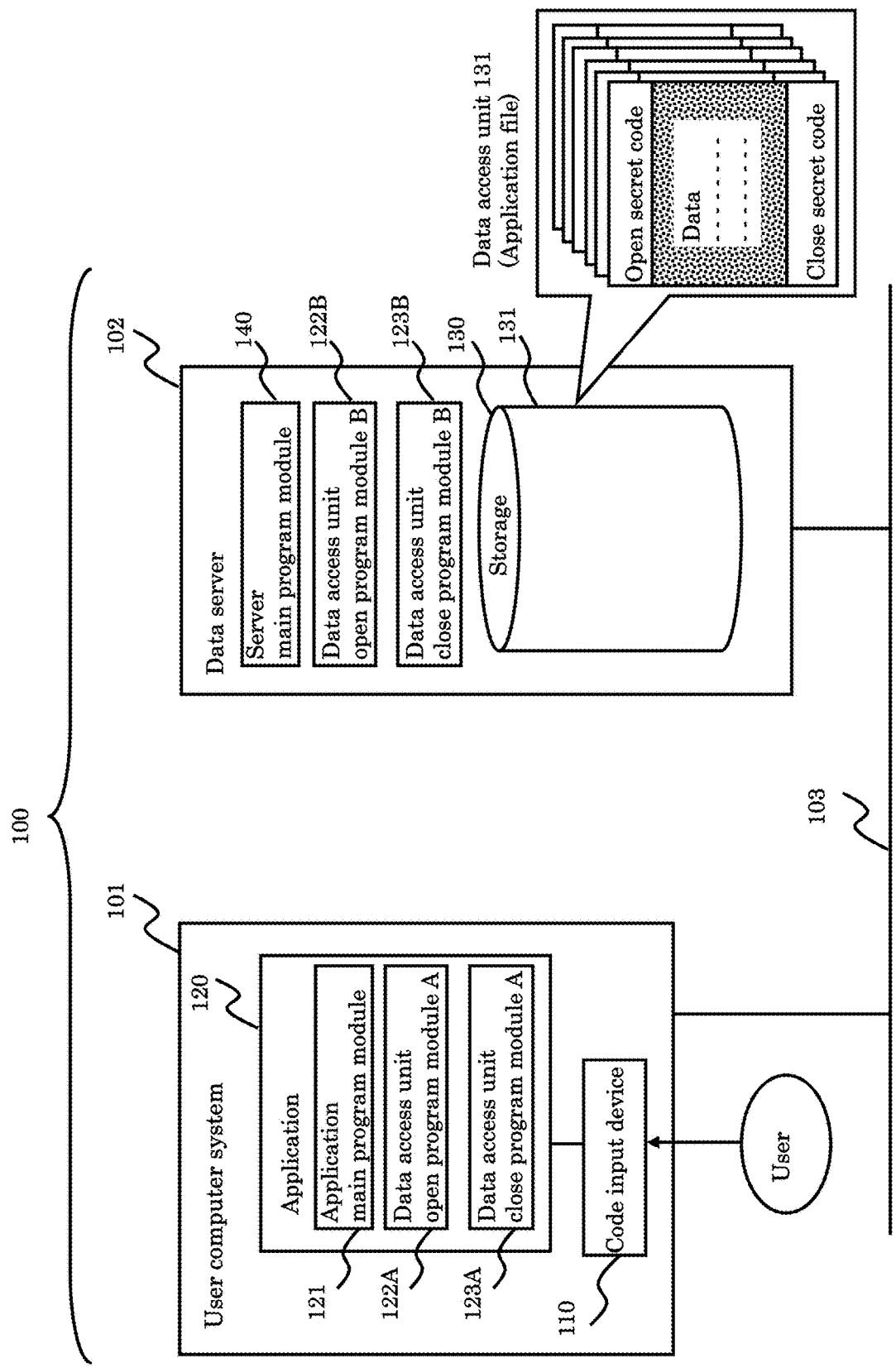
FIG. 1 is a schematic view (1) of the configuration of the data management system 100 according to Embodiment 1.
Figure 2:
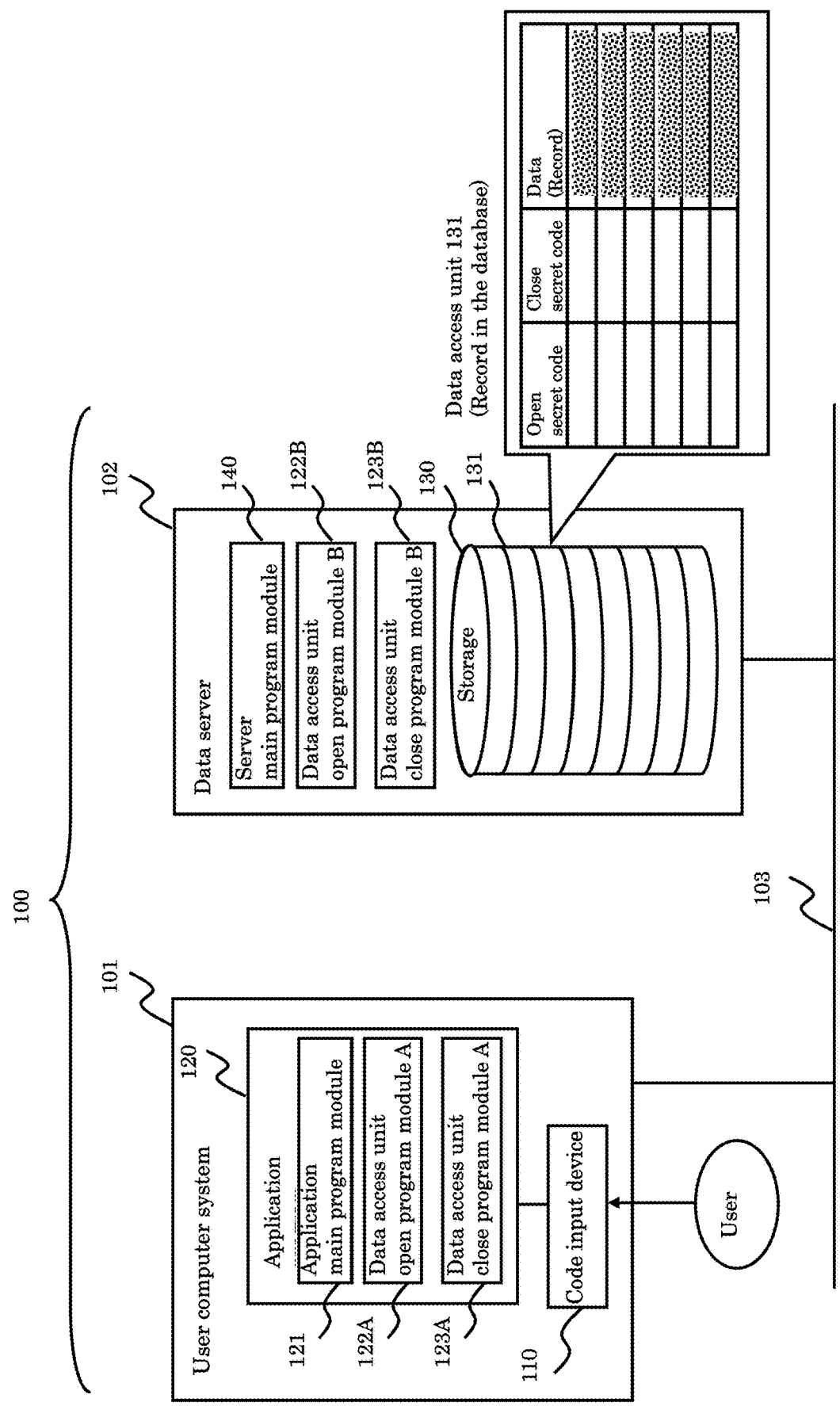
FIG. 2 is a schematic view (2) of the configuration of the data management system 100 according to Embodiment 1.

FIG. 1 and FIG. 2 show schematic views of the configuration of the data management system 100 according to Embodiment 1.

FIG. 1 shows a configuration of the data management system 100 when each data access unit 131 used in the application 120 is an application file, and each application file is stored in the data storage device 130 as the encrypted data file.

FIG. 2 shows a configuration of the data management system 100 when each data access unit 131 used in the application 120 is a data record or a data field in a record, each data record or a data field is stored in the data storage device 130 as the encrypted data record or data field.

In the storage device 130, the application file shown in FIG. 1, the record of the database, and the fields in the record of the database shown in FIG. 2 may be handled in a mixed manner. That is, the application file, the record of the database, and the field in the record of the database can be accessed by the application 120 according to the data access unit 131 form.

The data management system 100 according to the present invention is configured including a computer system 101 used by a user and a computer system 102 (data server 102) that manages the storage device 130 in which each data access unit 131 is stored in such a manner that is capable of data communication via the network 103.

The computer system 102 for managing the storage device 130 is described first. The computer system 102 comprises the storage device 130 and each data access unit 131 and the server main program module 140.

The data access unit 131 can be accessed by the application 120 and is a data which is a unit of browsing, output or editing. As described above, as the data access unit accessed by the application 120, the application file can be employed. For example, as shown in FIG. 1. if the application 120 is a database search application, there may be a record of the database or a field in the record, as shown in FIG. 2. These may be mixed.

An "open secret code" for accessing, output or editing by the application 120, and a "close secret code" for normally finishing the browsing, output or editing by the application 120 are set to each data access unit 131.

For example, in the case of an application file, the data access unit 131 comprises an "open secret code", a "data portion (file)" and a "close secret code" as shown in FIG. 1. When the data access unit 131 is a record or a field of the database, as shown in FIG. 2, an "open secret code", a "data portion (record)" and a "close secret code" are included.

For example, a PIN code such as a numeral or a character or a text code can be adopted as the open secret code or the close secret code.

For example, the code information stored in the IC card carried by the user can be adopted as the open secret code or the close secret code.

Also, for example, the biological information of the user can be adopted as the open secret code or the close secret code. The biological information may include a face image pattern, a fingerprint pattern, a vein pattern, an iris pattern, a voiceprint pattern, and the like.

In this example, the open secret code and the close secret code are described as biological information of the fingerprint pattern.

Here, although the open secret code and the close secret code are described as fingerprint patterns of the same finger, the open secret code and the close secret code may be different. For example, the open secret code can be a face image pattern, and a close secret code can be a different kind of biological information such as a voiceprint pattern.

A storage device 130 is accessible by the user computer system 101 used by the user on the network, and a plurality of data access units 131 are stored available in a search process, access process and output process.

The data management system 100 of the present invention, each data access unit 131 is stored in the encrypted state. The encryption processing is performed with each open secret code as a decryption key. In FIG. 1 and FIG. 2, the hatching effect is applied to the data body of the data access unit 131. In the following drawings, the data access unit 131 drawn with a hatching effect means that it is in an encrypted state, and the data access unit 131 drawn without a hatching effect means that it is in a decrypted state.

If the open secret code and the close secret code are the same, for example, if the fingerprint pattern of the index finger of the right hand is used both for the open secret code and the close secret code, the data body of the data access unit is encrypted with the feature points extracted from the fingerprint pattern of the index finger of the right hand. At the time of decryption, the data body of the data access unit is decrypted with the same feature points extracted from the same fingerprint pattern of the same index finger of the same right hand.

If desired, the open secret code and the close secret code are different from each other, For example, if the open secret code is the fingerprint pattern of the index finger of the right hand and the close secret code is the fingerprint pattern of the thumb of the right hand, the data relation setting can be set as follows. At the time of open processing for decryption, the data body of the data access unit has been encrypted with the feature points extracted from the fingerprint pattern of the index finger of the right hand in the previous closing, so the data body of the data access unit can be decrypted with the feature points extracted from the fingerprint pattern of the index finger of the right hand. At the time of closing processing for re-encryption, the fingerprint pattern of the thumb of the right hand is inputted, then the fingerprint pattern of the thumb of the right hand is used for authentication of the close secret code, and further, the fingerprint pattern of the thumb is related to the feature points extracted from the fingerprint pattern of the index finger of the right hand, which is inputted during the open processing is temporarily held and used for re-encryption without extracting the feature points from the fingerprint pattern of the thumb of the right hand.

The server main program module 140 is a basic program module provided as a data server. As will be described later, each processing such as retrieval, output, and storage of the data access unit 131 is executed in conjunction with the data access unit open program module 122B and the data access unit close program module 123B in the data server.

Next, the user computer system 101 used by the user is described.

The user computer system 101 comprises the code input device 110 and an application 120 in the example of this Embodiment 1.

The user computer system 101 may be a computer resource such as a personal computer, a tablet, a smartphone, etc. and is equipped with an input means such as a general keyboard or a touch input device, a display screen, and the like. As will be described later, the code input device 110 is a device for inputting the open secret code and the close secret code and may be other device than a keyboard or a touch input device.

The code input device 110 is a data input device equipped with the user computer system 101 and delivers the received data to the data access unit open program module 122A and the data access unit close program module 123A.

In this example, the code input device 110 is a device for inputting code information such as the open secret code and the close secret code set in the application file, the record or the field of the database, which is the data access unit 131.

The code input device 110 can utilize various input devices such as an IC card reader, a biological information reading device, an infrared reader, an ultrasonic receiver, and a QR code reader (camera) in addition to a general input device such as a keyboard and a touch panel according to the type of the open secret code and the close secret code. According to the operation of the system, an input device to be equipped may be employed.

For example, if the open secret code or the close secret code is data such as a PIN code, the code input device 110 may be a general input device such as a keyboard and a touch panel.

For example, if the open secret code or the close secret code is code information stored in the IC card carried by the user, the code input device 110 may be an IC card reader.

For example, if the open secret code or the close secret code is the biological information of the user, the code input device 110 may be a biological information reading device (a face image camera, a fingerprint pattern reader, a vein pattern reader, an iris pattern reader, a microphone, etc.).

When the biological information is adopted, the code input device 110 includes a biological information pattern conversion means, which extracts feature points from the data such as the face image pattern, the fingerprint pattern, the vein pattern, the iris pattern, and the voiceprint pattern, performs a predetermined calculation expression or conversion processing of the feature points, and converts it into code information. The biological information pattern inputted by the authentic user may be converted into the correct open secret code and the correct close secret code.

For example, when the open secret code and the close secret code are code information stored in the smartphone carried by the user and outputted by infrared rays, the code input device 110 may be an infrared reader.

For example, when the open secret code and the close secret code are code information stored in the device carried by the user and outputted by the ultrasonic wave, the code input device 110 may be an ultrasonic receiver.

For example, when the open secret code and the close secret code are code information stored in the smartphone carried by the user and displayed as a QR code, the code input device 110 may be a QR code reader (camera).

The application 120 may be software executable by the user computer system, and the application 120 is provided with the data access unit open program module 122A and the data access unit close program module 123A in addition to the main program module 121 of the application.

The main program module 121 of the application is not limited to applications and program modules, and various program modules can be provided by the application 120, and in the case of the business operation application, various program modules for executing the business operation are provided. A general-purpose program module such as a data browsing program module, a data output program module, a data editing program module, and a data storage program module can be also included.

A data access unit open program module 122 is activated by receiving an input of the open secret code via the code input device 110 to the data access unit 131 stored in the storage device 130 of the computer system 102 for managing the storage device 130 accessed by the application 120 of the user computer system 101 as a target.

In the configuration shown in FIG. 1, a part of the data access unit open program module 122 (data access unit open program module 122A) is installed in the application 120 of the user computer system 101, and the remaining part of the data access unit open program module 122 (data access unit open program module 122B) is installed in the computer system 102 for managing the storage device 130, and processing is advanced in cooperation with each other.

The data access unit open program module 122A and the data access unit open program module 122B are connected via the network 103 to receive an input of the open secret code to the data access unit 131 accessed as a target by using the application 120 by the user, and to download, decrypt and decode the data access unit 131 with the establishment of the authentication, and to perform processing such as browsing, output or editing. The detailed flow will be described later.

The data access unit close program module 123 is activated by receiving an input of the close secret code via the code input device 110 to the data access unit 131 which has been downloaded to the user computer system 101, decrypted and decoded, and processing such as browsing, output and editing is performed.

In the configuration of FIG. 1, a part (data access unit close program module 123A) of the data access unit close program module 123 is installed in the application 120 of the user computer system 101, and another part (data access unit close program module 123B) is installed in the computer system 102 for managing the storage device 130, and processing is advanced in cooperation with each other.

The data access unit close program module 123A and the data access unit close program module 123B are connected via the network 103 to receive an input of the close secret code to the data access unit 131 which has been downloaded, decrypted and decoded to the user computer system 101 via the network 103, and the data access unit 131 is finished and closed with the establishment of authentication with the close secret code set in the data access unit 131. The data access unit 131 is encrypted and closed so as the open secret code to be a decryption key. The detailed flow will be described later as an example of processing flow.

Next, the flow of processing of the data management system 100 of the present invention according to Embodiment 1 is described, in particular, the open processing to be started by receiving the input of the open secret code, and the close processing to be started by receiving the input of the close secret code are described in detail.

Figure 3:
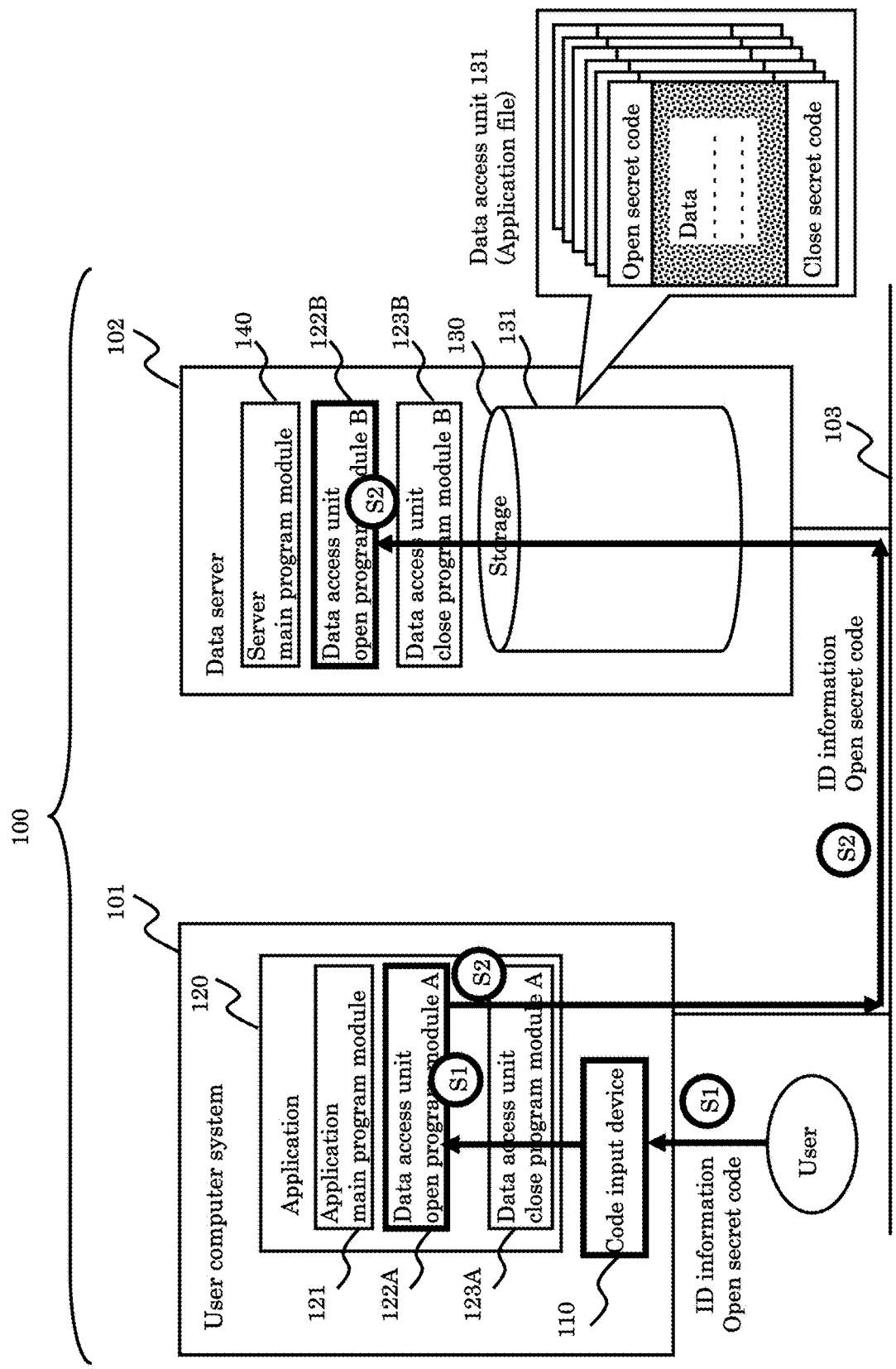
FIG. 3 is a schematic view showing the basic operation flow (1) from the application activation and the open processing after inputting of the open secret code.
Figure 4:
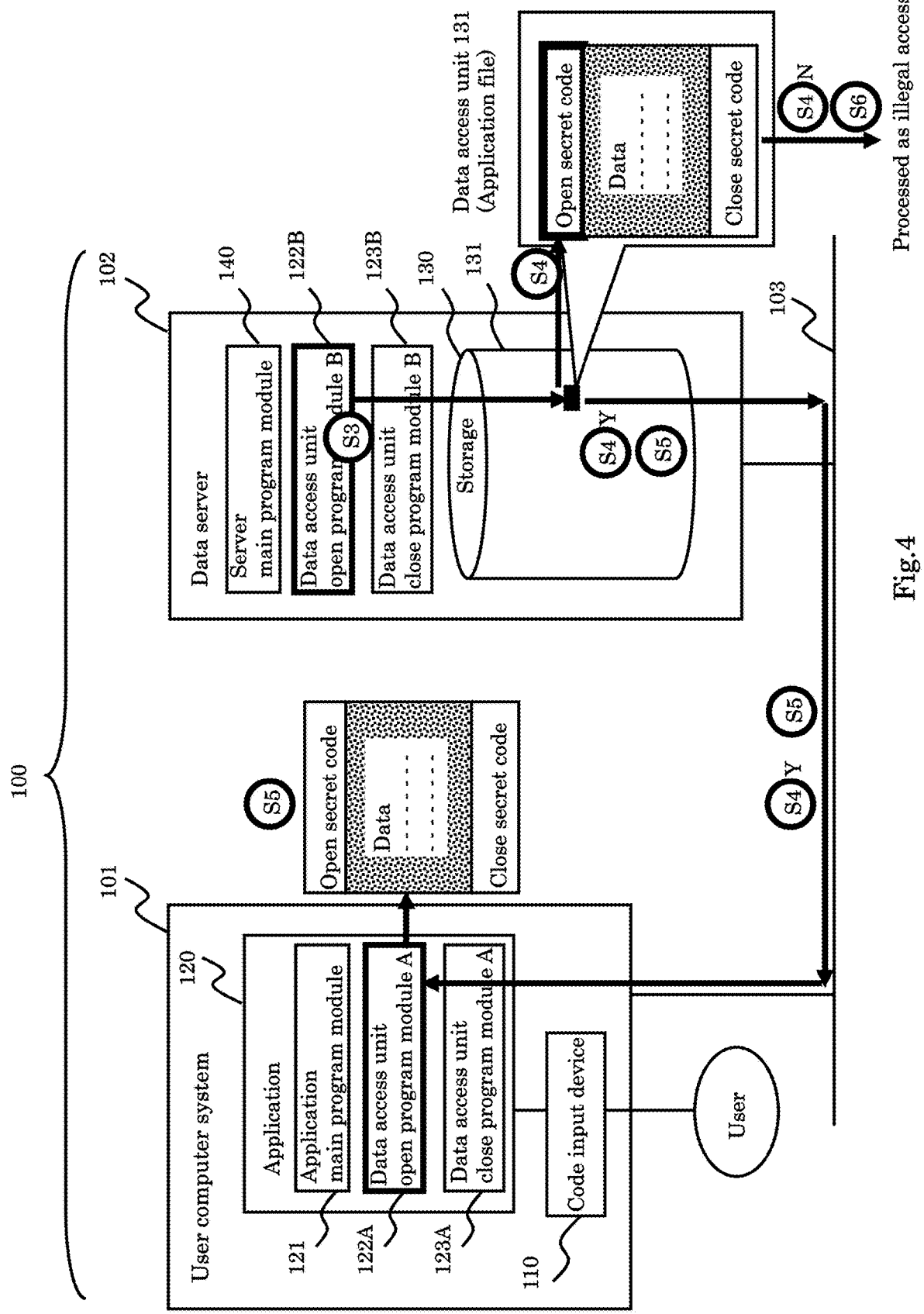
FIG. 4 is a schematic view showing the basic operation flow (2) from the application activation and the open processing after inputting of the open secret code.
Figure 5:
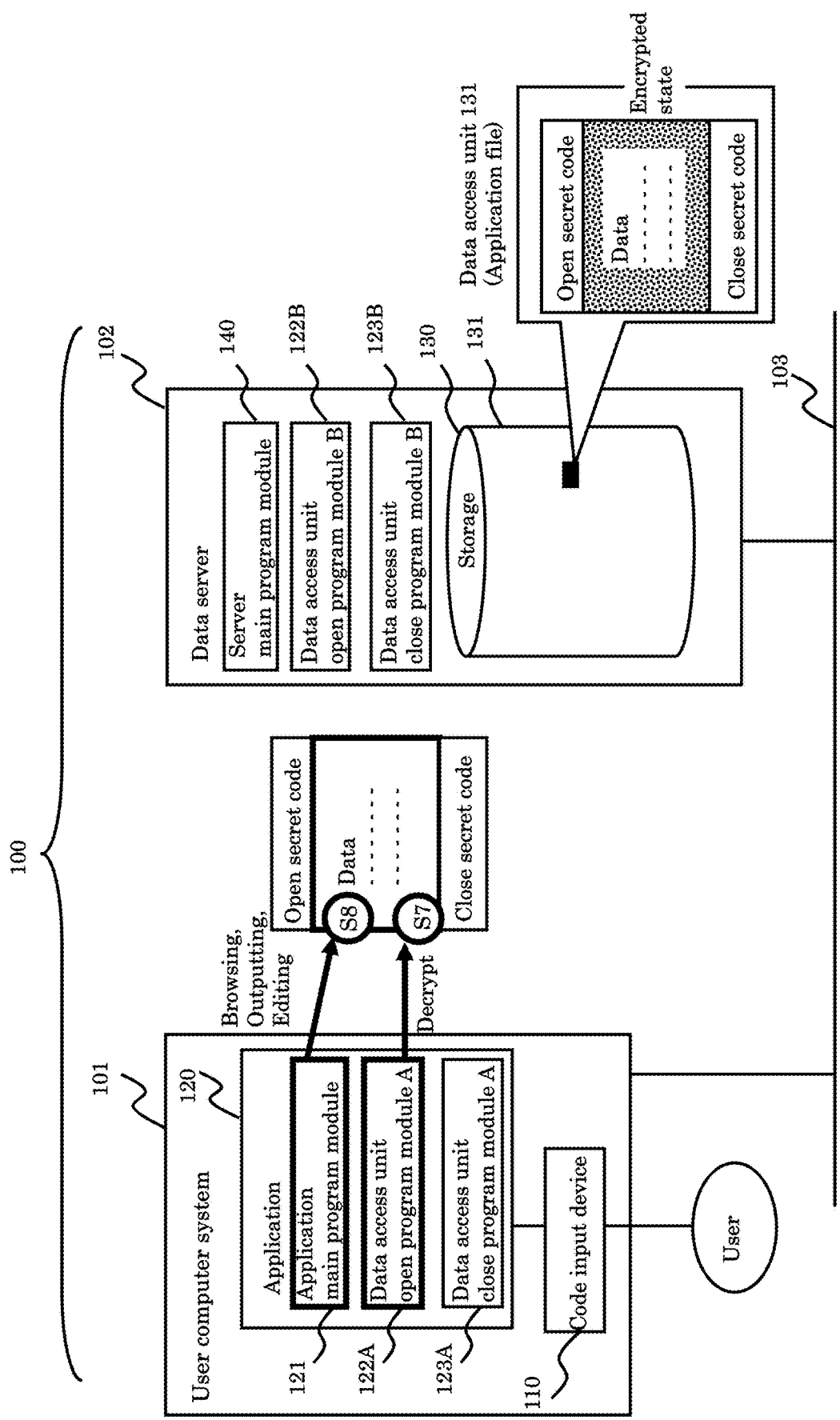
FIG. 5 is a schematic view showing the basic operation flow (3) from the application activation and the open processing after inputting of the open secret code.
Figure 7:
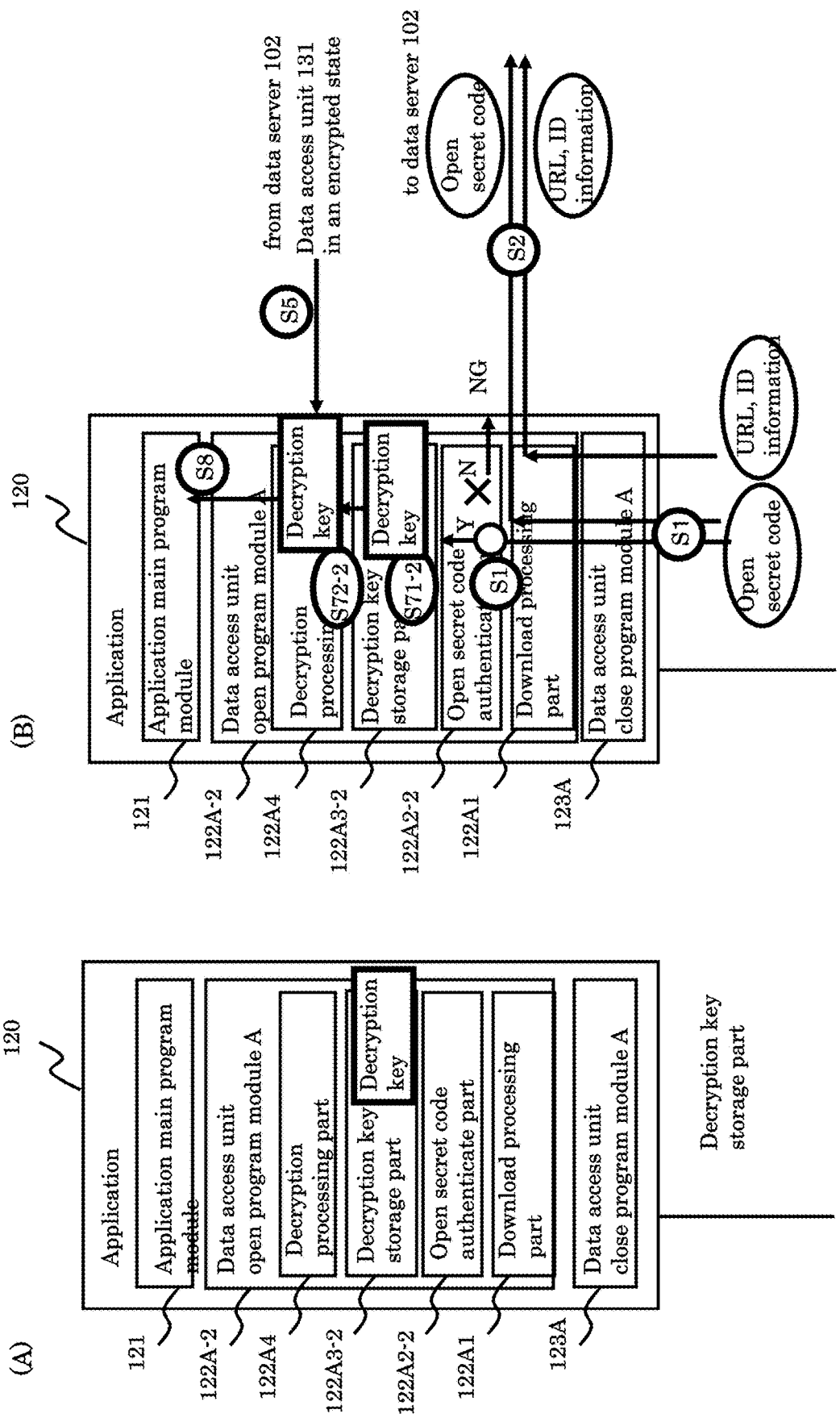
FIG. 7(A)-(B) is a schematic view showing the configuration and processing flow (2) of an application 120, especially, the data access unit open program module 122A.
Figure 8:
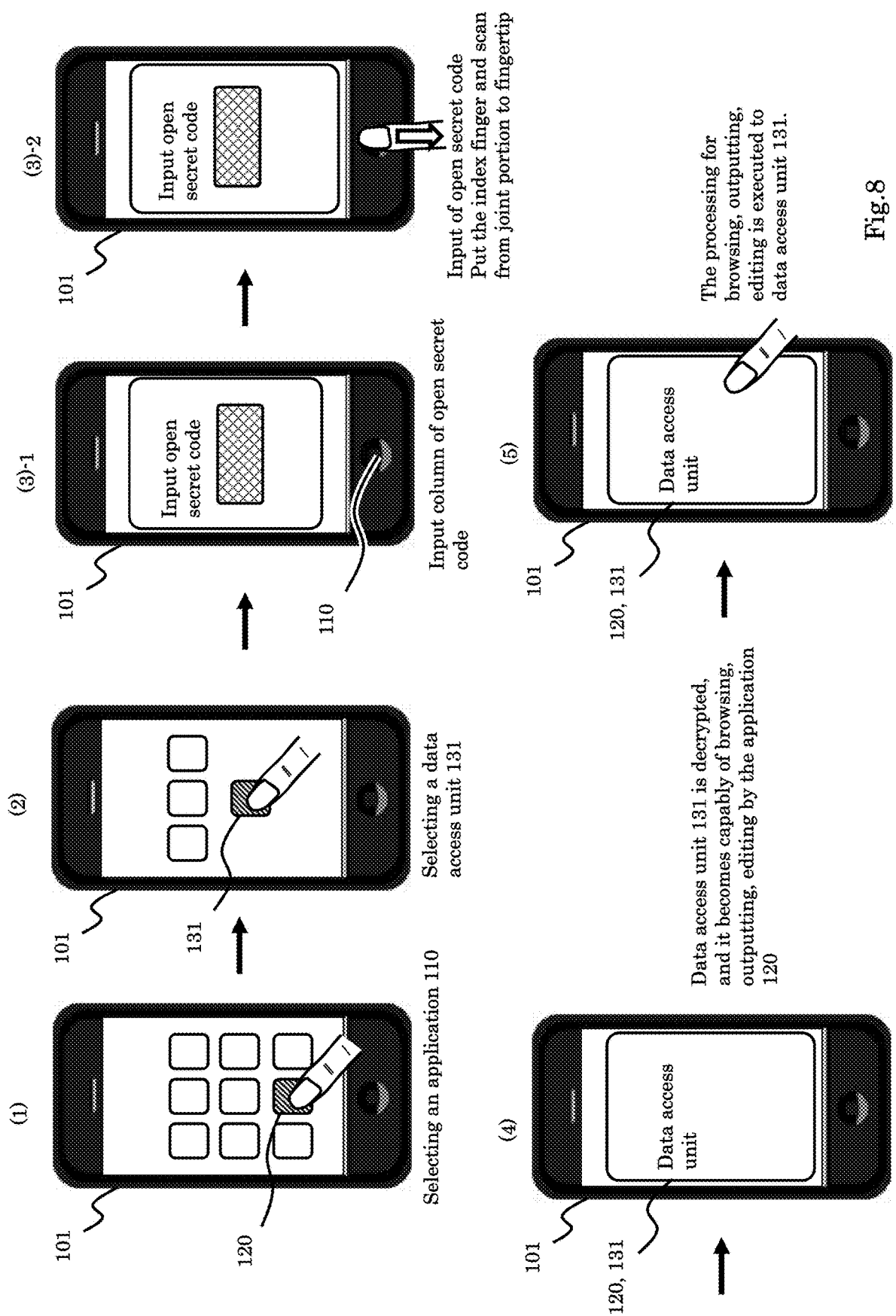
FIG. 8 is a schematic view showing the example of the operation on the operation screen from the application activation to the input of the open secret code.

FIG. 3 to FIG. 5 are figures showing the schematic view explaining the outline of the open processing to be started by receiving the input of the open secret code from the activation of the application. FIG. 6 and FIG. 7 are figures showing the configuration and the basic flow of processing of the data access unit open program module 122A. FIG. 8 is a figure showing an example of an operation on the operation screen. The following flow is an example and may be replaced by replacing a part of the operation flow to alternative operation flow.

Although the data access unit 131 is an example of the application file shown in FIG. 1, the data access unit 131 can be similar to the record or field of the database shown in FIG. 2, and the common operations are omitted here.

The user selects and starts the application 120 (FIG. 8 (1)). Candidates of the accessible data access unit 131 are displayed by the icon, and a selected one icon of data access unit 131 is depressed for as a target for accessing (FIG. 8 (2)). Here, ID information and URL information for specifying the data access unit are given.

The input screen of the open secret code is displayed, and the input of the open secret code is requested (FIG. 8 (3)-1). The open secret code set in the data access unit 131 desired to be accessed as a target is input via the code input device 110 by a user (Step S1, FIG. 8 (3)-2). In this example, the smart phone is equipped with the fingerprint authentication device, and fingerprint input of the index finger is performed by rubbing the index finger.

The data access unit open program module 122A receiving the ID information, the URL information and the open secret code of the data access unit transmits the open secret code to the data access unit open program module 122B on the side of the data server 102 via the network 103 (Step S2).

Next, as shown in FIG. 4, the data access unit open program module 122B specifies the corresponding data access unit 131 in conjunction with the server main program module 140 (Step S3), and confirms the authentication of the open secret code (Step S4).

If the authentication of the open secret code is established (Step S4: Y), the data access unit 131 is transmitted to the data access unit open program module 122A on the user computer system 101 side via the network 103. That is, it is downloaded (Step S5). The downloaded data access unit 131 is transmitted in an encrypted state.

When the authentication of the open secret code is not established (Step S4: N), it is handled as an unauthorized access (Step S6). Since the input mistake of the open secret code can be performed even by the authentic user, the operation of making the input of the open secret code multiple times can be permitted.

Next, as shown in FIG. 5, the data access unit open program module 122A receiving the data access unit 131 downloaded to the user computer system 101 decrypts and decodes the encrypted data access unit 131 (FIG. 5 Step S7). Here, the decryption key and the open secret code are the same. That is, the data access unit 131 can be decrypted and decoded by the open secret code.

Here, processing in the data access unit open program module 122A is shown in detail. Here, two patterns are shown.

The first pattern is a pattern for generating a decryption key from the inputted open secret code. FIG. 6 is a figure showing the configuration and processing flow of the data access unit open program module 122A-1 of the first pattern.

FIG. 6 (A) is a figure showing a sub configuration of an application 120, especially the data access unit open program module 122A-1 in the case of the first pattern. As shown in FIG. 6 (A), the data access unit open program module 122A-1 includes the download processing part 122A1, the open secret code authenticate part 122A2-1, the decryption key generation part 122A3-1, and the decryption processing part 122A4.

FIG. 6 (B) shows the data processing of the application 120, in particular, the data access unit open program module 122A-1 in the first pattern. The open secret code, URL and ID information inputted in Step S1 are sent to the data server 102 via the download processing part 122A1 to prepare download, and the open secret code temporarily stored in the open secret code authenticate part 122A2-1 is passed to the decryption key generation part 122A3-1. The decryption key generation part 122A3-1 generates the decryption key from the open secret code (Step S71-1). That is, the decryption key generation part (122A3-1) is provided with a conversion program module or a calculation program module and has the ability to generate a decryption key from the open secret code. The conversion program module may be non-performed, in other words, the open secret code itself may be a decryption key. The generated decryption key is passed to the decryption processing part 122A4. The data access unit 131 in the encrypted state downloaded from the data server 102 is inputted to the decryption processing part 122A4 via the download processing part 122A1 (FIG. 4 Step S5), and decoded by using the decryption key in the decryption processing part 122A4 to enable browsing, output and editing (FIG. 6 Step S72-1). In FIG. 6 (*b*), according to convenient drawing, the input of the data access unit 131 in the encrypted state to the decryption processing part 122A4 by the step S5 is not shown as passing through the download processing part 122A1.

The data access unit 131 can be browsed, output, or edited. For example, processing is executed by the application main program module 121 (FIG. 5 Step S8). That is, the user or the third party allowed to view by the user can perform processing such as browsing, output, editing, etc. to the data access unit 131.

Then, the second pattern performs authentication processing from the inputted open secret code, the decryption key is stored in the user computer system 101, and if the authentication of the open secret code is established, the stored decryption key is used. FIG. 7 is a figure showing the configuration and processing flow of the data access unit open program module 122A-2 of this second pattern.

FIG. 7 (A) shows the sub-configuration of the application 120, in particular, the data access unit open program module 122A-2 in the second pattern. As shown in FIG. 7 (A), data access unit open program module 122A-2 comprises the download processing part 122A1, the open secret code authenticate processing part 122A2-2, the decryption key storage part 122A3-2 and the decryption processing part 122A4. The decryption key is previously stored in the decryption key storage part (122A3-2).

FIG. 7 (B) shows the data processing of the application 120, in particular, the data access unit open program module 122A-2 in the second pattern. The open secret code, URL, and ID information inputted in Step S1 are sent to the data server 102 via the download processing part 122A1 to prepare for downloading. The open secret code is authenticated in the open secret code authenticate processing part 122A2-2. When authentication is successful, the decryption key is extracted from the decryption key storage part 122A3-2 (Step S71-2). The decoding processing unit 122A4 is transferred to the decoding processing unit 122*a*4. In other words, the decryption key storage part 122A3-2 stores the decryption key in advance and passes the decryption key to the decryption processing part 122A4. If the authentication of the open secret code is established, the data access unit 131 in an encrypted state downloaded from the data server 102 is inputted to the decryption processing part 122A4 via the download processing part 122A1 (FIG. 4 Step S5), and decoded by using the decryption key in a decryption processing part 122A4 to enable browsing, output and editing (FIG. 6 Step S72-2). In FIG. 7 (*b*), according to convenient drawing, the input of the data access unit 131 in the encrypted state to the decryption processing part 122A4 by the Step S5 is not shown as passing through the download processing part 122A1.

The data access unit 131 can be browsed, output, or edited. For example, processing is executed by the application main program module 121 (FIG. 5 Step S8). That is, the user or the third party allowed to view by the user can perform processing such as browsing, output, editing, etc. to the data access unit 131.

Next, the outline of the processing from the closing process started by receiving the input of the close secret code to the end of the application is described.

Figure 9:
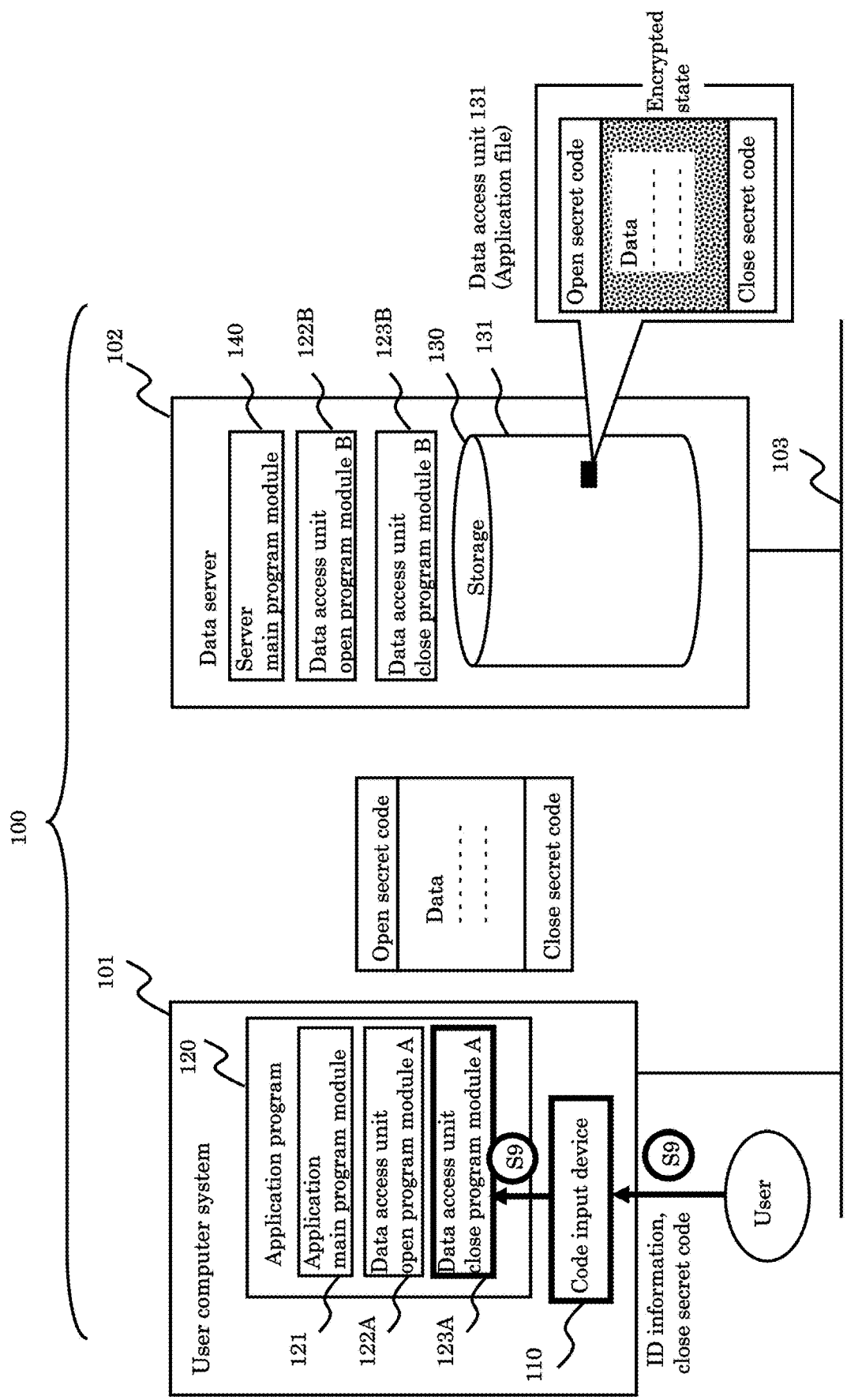
FIG. 9 is a schematic view showing the basic operation flow (1) from the close processing after inputting of the close secret code to the application deactivation.
Figure 12:
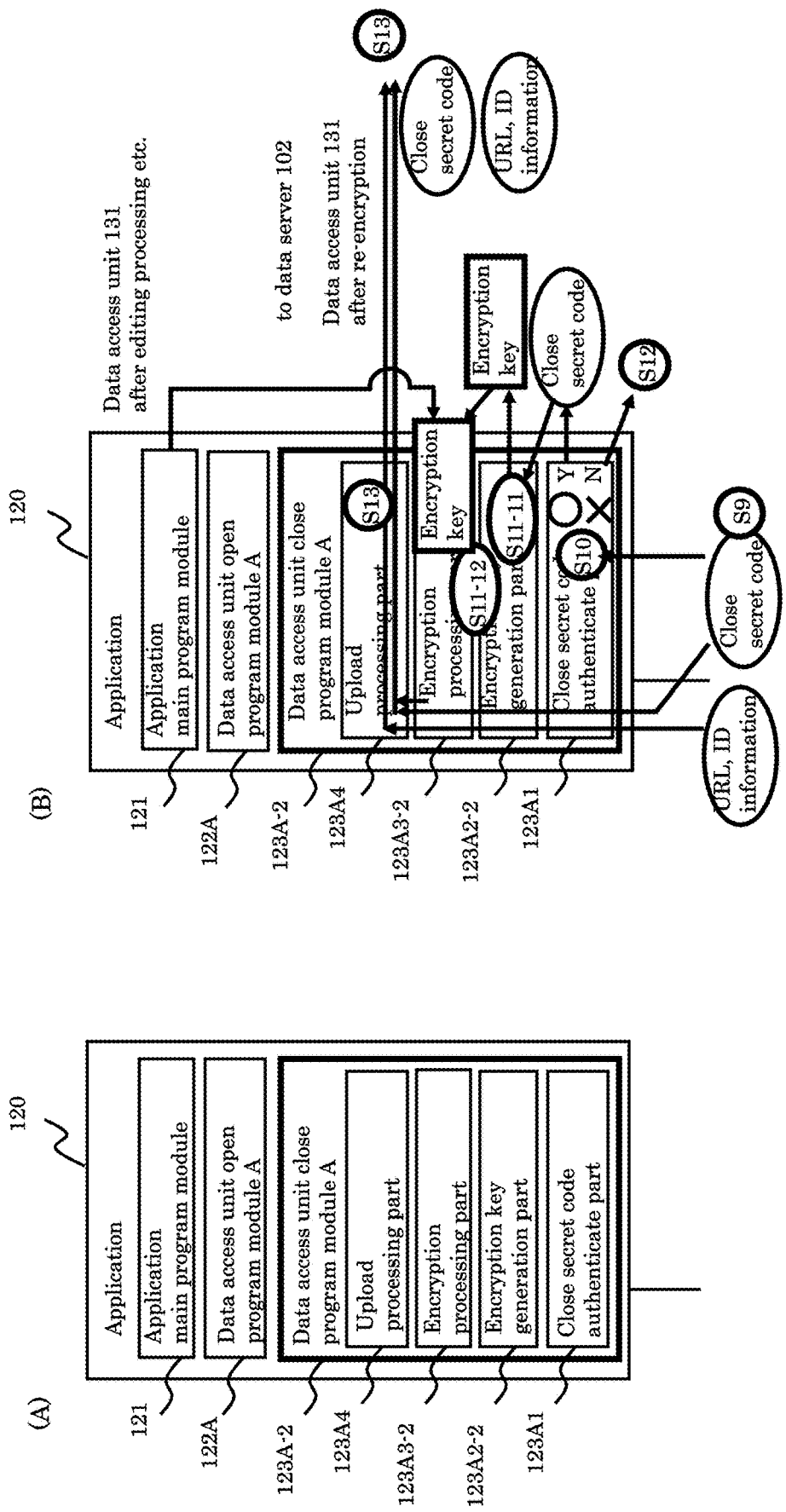
FIG. 12(A)-(B) is a schematic view showing the configuration and processing flow (1) of an application 120, especially, the data access unit locking program module 123A.
Figure 13:
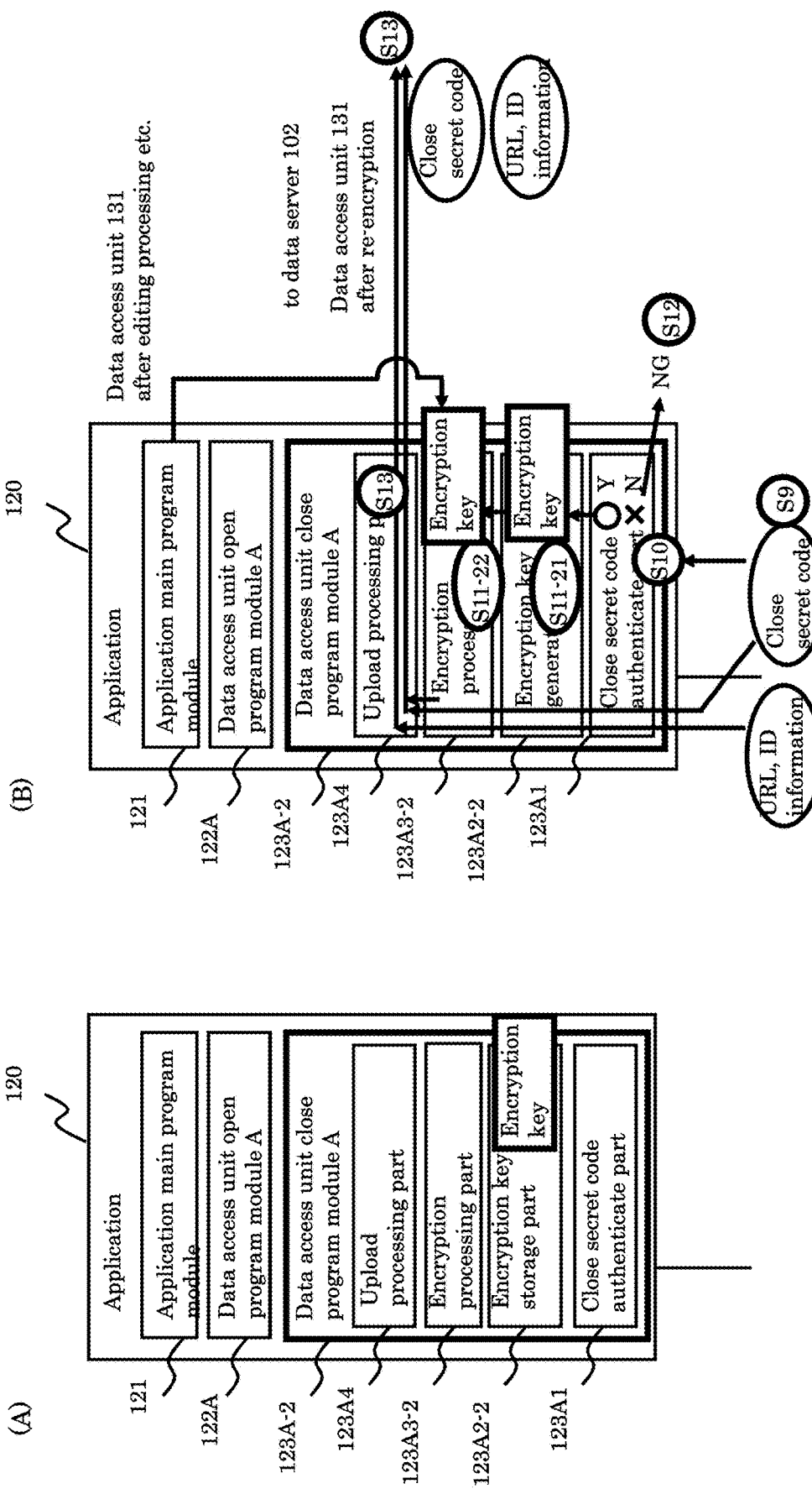
FIG. 13(A)-(B) is a schematic view showing the configuration and processing flow (2) of an application 120, especially, the data access unit locking program module 123A.
Figure 14:
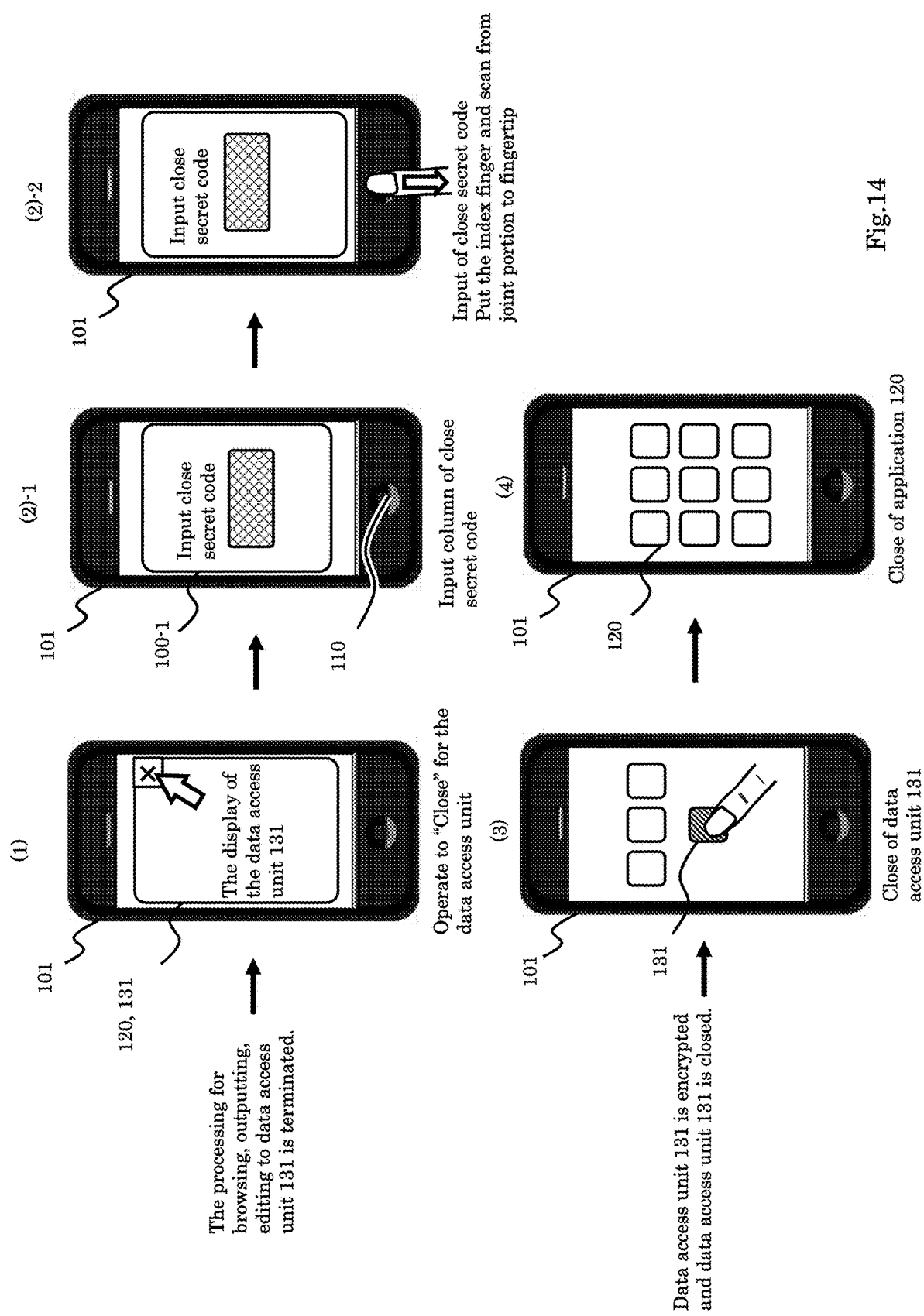
FIG. 14 is a schematic view showing the example of the operation on the operation screen from the input of the close secret code to the application deactivation.

FIG. 9 is a schematic view showing the outline of the processing from the closing process started upon receiving the input of the close secret code to the end of the application. FIG. 12 and FIG. 13 are figures showing the configuration of the data access unit close program module 123A and the flow of processing. FIG. 14 is an example of operations on the operation screen. The following flow is an example and may be replaced by replacing a part of the operation flow to alternative operation flow.

As shown in FIG. 9, when necessary processing such as browsing, output and editing are completed, a close button is depressed (FIG. 14 (1)). An input screen of the close secret code for normally ending and closing the data access unit 131 is displayed. An input of the close secret code is requested (FIG. 14 (2)-1). The user himself/herself inputs the close secret code (FIG. 14 (2)-2, FIG. 9 Step S9).

Figure 10:
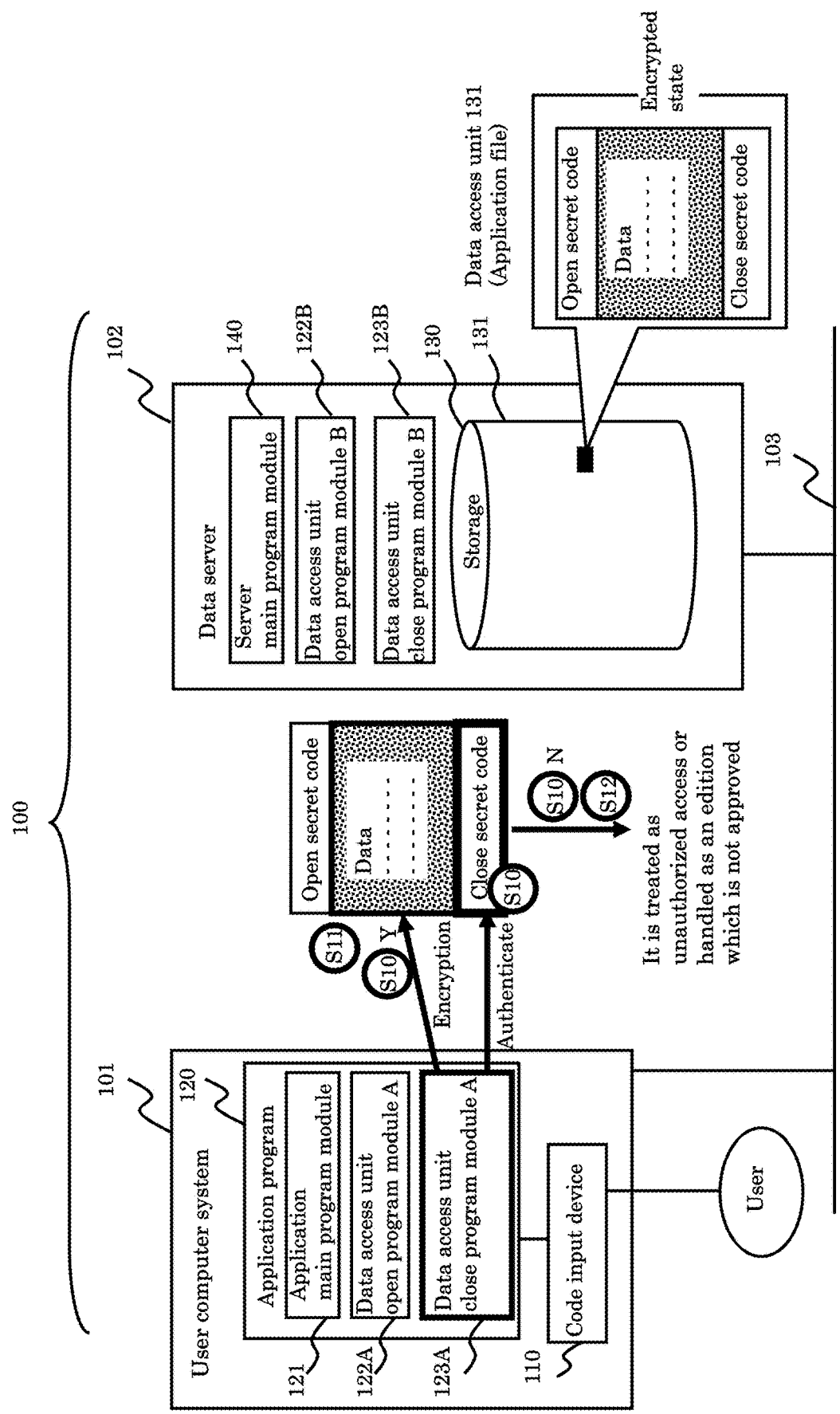
FIG. 10 is a schematic view showing the basic operation flow (2) from the close processing after inputting of the close secret code to the application deactivation.

As shown in FIG. 10, the data access unit close program module 123A receiving the close secret code performs authentication processing for matching the close secret code with the close secret code set in the data access unit 131 (FIG. 10).

If the authentication of the close secret code is established (Step S10: Y), the data access unit close program module 123A executes processing accompanying the completion of browsing to the data access unit 131, the end of the output, the determination of the editing content of the data editing, and the normal termination such as data storage. First, the data access unit close program module 123A re-encrypts the data access unit 131 after accepting the change of the data editing content (FIG. 10 Step S11). Here, the encryption processing is executed with the condition that the decryption key required in the next decryption processing in the next open processing is the open secret code. Here, the decryption is performed with the open secret code inputted during the open processing. When the open secret code and the close secret code are the same, it is preferable to decrypt by the close secret code inputted at the time of closing processing. Here, the decryption key and the open secret code are the same. That is, the data access unit 131 can be decoded by the open secret code.

A data access unit close program module 123A normally terminates the data access unit 131 displayed on the application 120 (FIG. 14 (3)), and the application 120 is normally ended (FIG. 14 (4)).

Here, processing in the data access unit close program module 123A is shown in detail. Here, two patterns are shown.

The first pattern is a pattern for generating an encryption key from the input close secret code. FIG. 12 is a figure showing the configuration and processing flow of the data access unit close program module 123A-1 of the first pattern.

FIG. 12 (A) is a figure showing the sub configuration of the application 120, in particular, the data access unit close program module 123A-1 in the case of the first pattern. As shown in FIG. 12 (A), the data access unit close program module 123A-1 includes the close secret code authentication processing part 123A1, the encryption key generation part 123A2-1, the encryption processing part 123A3-1, and the upload processing part 123A4.

FIG. 12 (B) shows the data processing of the application 120, in particular, the data access unit close program module 123A-1 in the first pattern.

Figure 11:
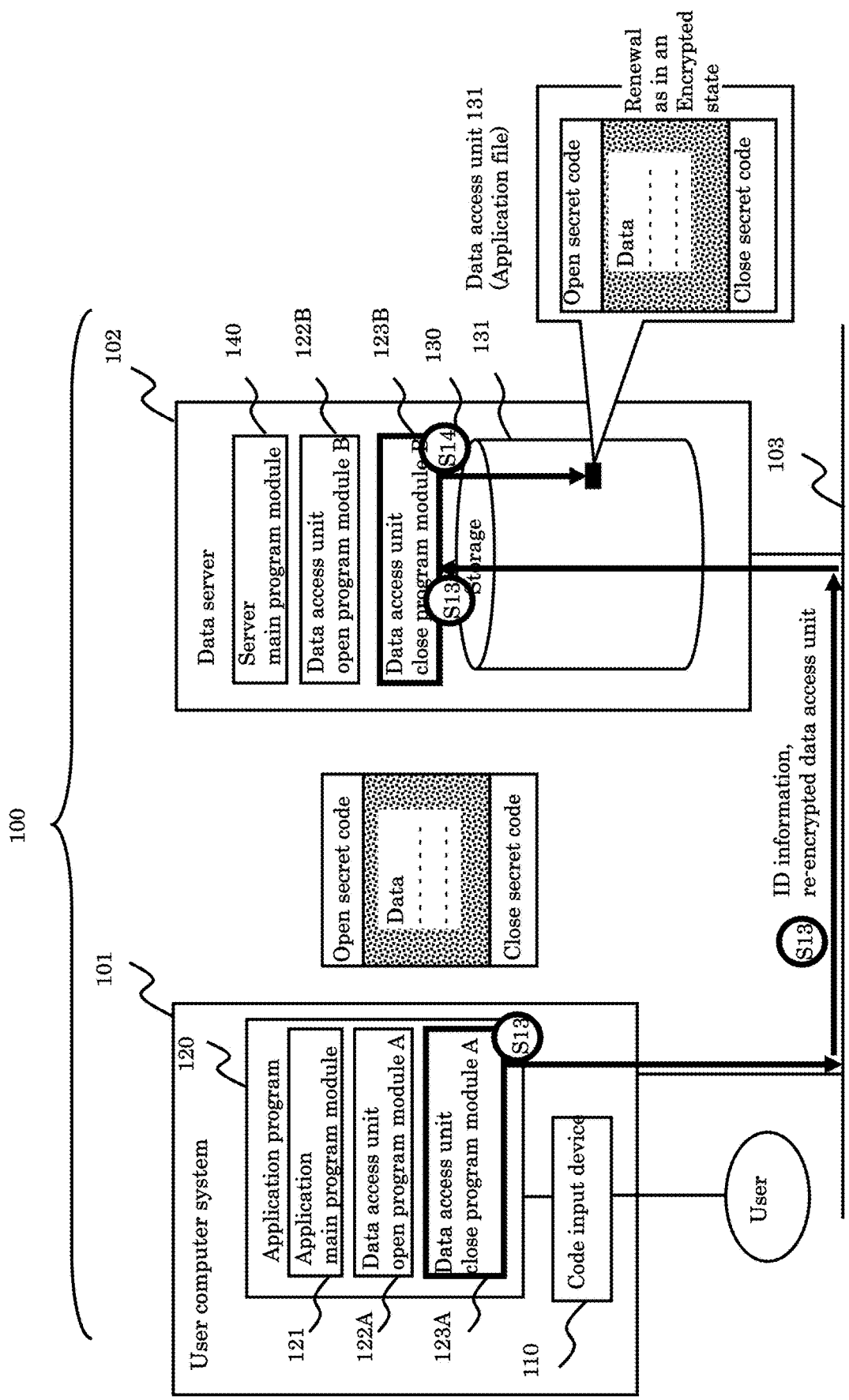
FIG. 11 is a schematic view showing the basic operation flow (3) from the close processing after inputting of the close secret code to the application deactivation.

The close secret code, and the URL and the ID information inputted in the FIG. 9 Step S9 are passed to the close secret code authentication processing part 123A-1. The authentication processing is executed in the close secret code authentication processing part 123A-1 (FIG. 12 Step S10), when the authentication processing is successful (FIG. 12 Step S10: Y), the close secret code is passed to the encryption key generation part 123A2-1 to generate the encryption key (FIG. 12 Steps S11-11). The encryption key generation unit 123A-2-1 is provided with a conversion program module or a calculation program module and has the ability to generate an encryption key from the close secret code. The conversion program module may be non-performed, that is, the close secret code itself may be the encryption key. The generated encryption key can encrypt data as being decryptable by the decryption key generated by the decryption key generation unit 122A-2-1 from the open secret code. The generated encryption key is passed to the encryption processing part 123A3-1. The editing processing to the data access unit 131 is finished and passed from the application main program module 121 to the encryption processing part 123A3-1 and re-encrypted by using the encryption key in the encryption processing part 123A3-1 (FIG. 12 Steps S11 to S12). The data access unit 131 in a re-encrypted state is uploaded to the data server 102 via the upload processing unit 123A4 (FIG. 11 Step S13).

When the authentication of the close secret code is not established (FIG. 10 and FIG. 12 Steps S10: N), the editing content of the third party who performs unauthorized access or editing is handled as an editing which is not approved by the user (FIG. 10 and Step S12). The data access unit 131 is not passed to the data access unit close program module 123B, and transmits information indicating that the data access unit close program module 123B does not update, so that the data access unit close program module 123B does not change the original data access unit 131 as it is in the storage device 130.

Since the input mistake of the close secret code can be performed even by the authentic user, the operation of making the input of the close secret code multiple times can be performed.

The second pattern is a pattern using the encryption key stored in the encryption key storage unit. FIG. 13 is a figure showing the configuration and processing flow of the data access unit close program modules 123A-2 of the second pattern.

FIG. 13 (A) shows the sub configuration of the application 120, in particular, the data access unit close program module 123A-2 in the case of the second pattern. As shown in FIG. 13 (A), the data access unit close program module 123A-2 includes the close secret code authentication processing part 123A1, the encryption key storage part 123A2-2, the encryption processing part 123A3-2, and the upload processing part 123A4.

FIG. 13 (B) shows the data processing of the application 120, in particular, the data access unit open program module 122A-2 in the second pattern.

The close secret code, URL, ID information inputted in the FIG. 9 Step S9 is the open secret code authentication processing part 123A1. When the authentication processing is successful in the close secret code authentication processing part 123A1 (FIG. 13 Step S10), the closing secret code is passed to the encryption key storage part 123A2-2, and the encryption key stored in the encryption key storage part 123A2-2 is extracted and passed to the encryption processing part 123A4 (FIG. 13 Steps S11 to S21). In other words, the encryption key storage unit 123A2-2 stores the encryption key in advance, and when the authentication of the close secret code is established, the encryption key is passed to the encryption processing unit 123A3-2.

The editing processing to the data access unit 131 is finished and passed from the application main program module 121 to the encryption processing part 123A3-2 and re-encrypted by using the encryption key in the encryption processing part 123A3-2 (FIG. 13 Steps S11 to S12). The data access unit 131 in a re-encrypted state is uploaded to the data server 102 via the upload processing unit 123A4 (FIG. 13 Step S13).

Referring again to FIG. 11, the explanation is continued. As shown in FIG. 11, the data access unit close program module 123A transmits re-encrypted data access unit 131 to the computer system 102 which is the data server from the user computer system 101 via the network 103. That is, uploading is performed (FIG. 11 Step S13). The uploaded data access unit 131 is transmitted in a re-encrypted state. The data access unit close program module 123B receiving the data access unit 131 stores the data access unit 131 in a predetermined storage place and predetermined storage format in the storage device 130 (FIG. 11 Step S14).

Embodiment 2

Embodiment 2 is an example in which the data access unit 131 is decomposed and stored in a plurality of storage devices distributed on a network.

In the following description, the part which is the same as that of Embodiment 1 will be omitted and a different part will be described.

In the data management system 100a according to Embodiment 2, the data access unit 131 is decomposed to a plurality of pieces of decomposition pieces, and a plurality of encrypted decomposition pieces, each of which is subjected to encryption processing, are further added to each of a plurality of storage devices on the network. Even if one decomposition piece is obtained, the contents of the data are unknown, and the individual decomposition pieces are encrypted to further improve the security.

When browsing, outputting and editing the data access unit 131 on the user computer system 101, a plurality of individual encrypted decomposition pieces distributed on the network are collected and processed under the condition of establish of the authentication of the open secret code. A plurality of individual encrypted decomposition pieces of the data access unit 131 are collected, re-composed and decrypted to reproduce the original data access unit 131.

After the original data access unit 131 is reproduced, and read, output and edit are executed, the data access unit 131 is encrypted and decomposed into pieces to be distributed and held in a plurality of storage devices on the network under the condition of establishing the authentication of the close secret code.

Figure 15:
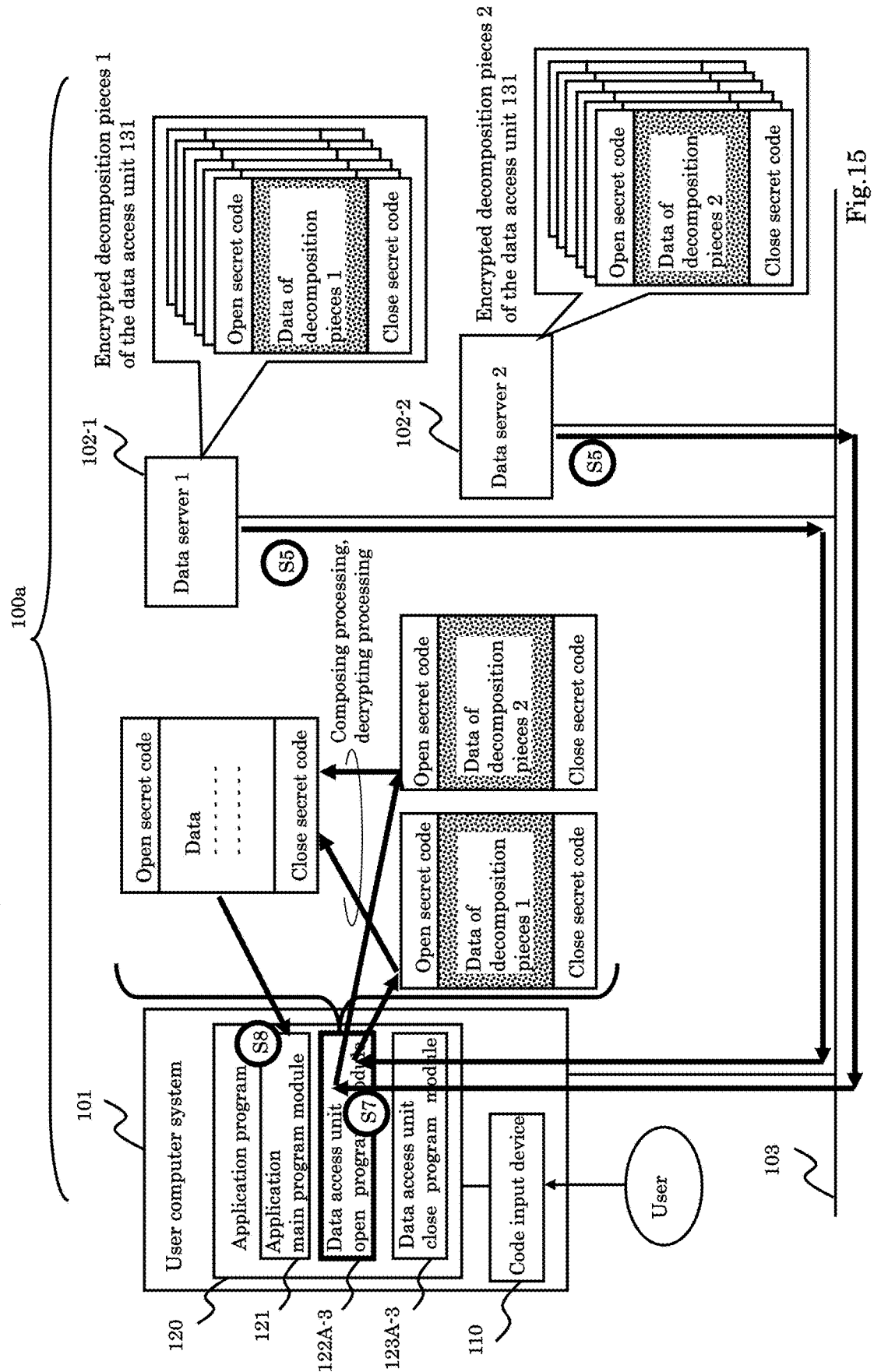
FIG. 15 is a schematic view showing the flow of data at the time of browsing, output and editing in the data management system 100a according to Embodiment 2.

FIG. 15 is a figure showing the flow of data at the time of browsing, output and editing in the data management system 100*a* according to Embodiment 2. In particular, the downloading of the encrypted decomposition piece, the re-composing of these encrypted decomposition piece, and the decrypting and reproducing the original data access unit 131 are shown.

In the example shown in FIG. 15, only two of the data server 102-1 and the data server 102-2 are shown as the data server 102, but it is needless to say that the data server 102 can be distributed to three or more. An encrypted decomposition piece (1) of the data access unit 131 is stored and held in the data server 102-1, and the encrypted decomposition piece (2) of the data access unit 131 is stored and held in the data server 102-2 distributed and held on the network.

In the case of browsing, outputting and editing the data access unit 131 by the user computer system 101, the encrypted decomposition piece 1 and the encrypted decomposition piece 2 distributed and held on the network are respectively downloaded and collected by the data access unit open program module 122A-3. The collected encrypted decomposition piece 1 and the encrypted decomposition piece 2 are composed as an encrypted data access unit 131 in an encryption state by the composing processing. The decryption processing is successively performed to obtain a browsing, output, and editable data access unit 131 (FIG. 15 Step S7). This is a mechanism to reproduce the data access unit 131 to be browsed, output, and edited by the application main program module (FIG. 15 Step S8).

Figure 16:
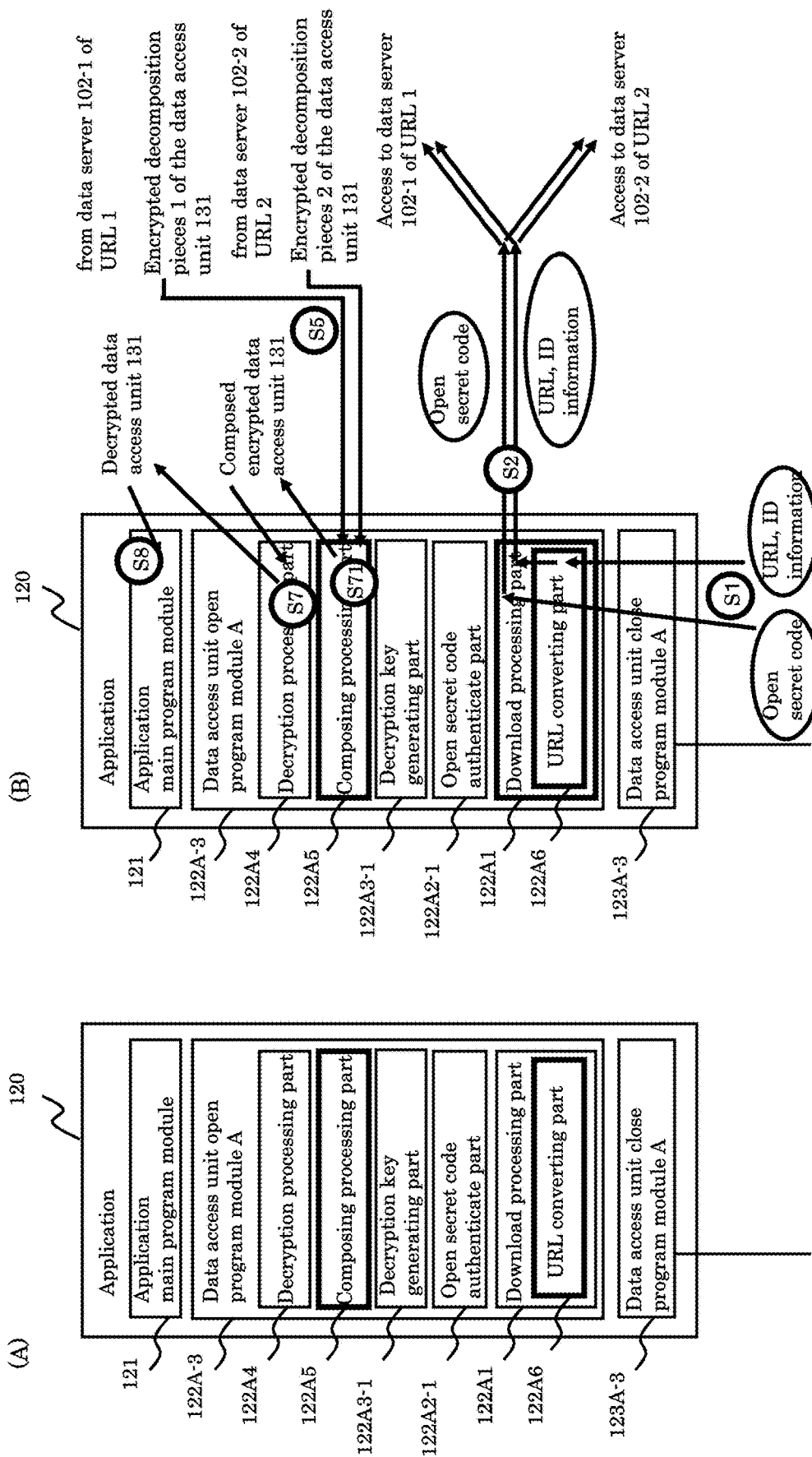
FIG. 16(A)-(B) is a schematic view showing a configuration and the data flow of the application 120 focusing on download process, composing process, and decrypting process of the encrypted decomposition piece.

FIG. 16 is a figure showing the configuration of the application 120 of the data management system 100*a* and the basic flow of data processing using the download of the encrypted decomposition piece accompanying the input of the open secret code, the composing and decrypting the encrypted decomposition piece.

FIG. 16 (A) is a figure for easily showing the configuration of data access unit open program module 122A-3 of the application 120. Compared to the configuration example of Embodiment 1 shown in FIG. 6 (A), the URL conversion part 122A6 in the download processing part 122A1 and the composition processing part 122A5 are added.

The URL conversion unit 122A6 is provided with a program module for converting each data server 102-1 distributed on the network into URL information of the data server 102-1 and the data server 102-2 on the basis of the ID information and URL information inputted from the user to access the data access unit 131. That is, the user does not need to know how the data access unit 131 is decomposed and distributed in any manner. The same as the case of Embodiment 1, the user only inputs the nominal ID information and URL information at the accessing of the data access unit 131 as if the data access unit 131 is integrated without recognizing the respective encrypted decomposition pieces are distributed. The nominal URL information is converted into each URL information of each data server 102-1 and data server 102-2 by the URL conversion part 122A6.

A composition processing part 122A5 performs processing for assembling the decomposed encrypted decomposition pieces and composing the data access units 131 in the encrypted state. In this Embodiment 2, the encrypted decomposition pieces are decrypted after composing the data access units 131 in the encrypted state, but the different flow can be possible that respective encrypted decomposition pieces are decrypted by the decrypting processing unit 122A4 first, and then combined by the composition processing unit 122A5.

FIG. 16 (B) shows the flow of processing in the case of browsing, outputting, and editing the data access unit 131 by using the user computer system 101.

First, the user inputs the open secret code, nominal URL information and ID information through the code input device 110 to the download processing part 122A1 of the application 120 (FIG. 3, FIG. 16 Step 1), and the URL conversion part 122A6 converts the nominal URL information into the distributed URL information (URL 1, URL 2). The download processing part 122A1 performs download processing on the basis of each distributed URL information and ID information (FIG. 3, FIG. 16 Step S2). Here, the download processing part 122A1 tries to download the encrypted decomposition piece 1 from the data server 102-1 of the URL 1, and the encrypted decomposition piece 2 from the data server 102-2 of the URL 2.

As shown in FIG. 16, the encrypted decomposition piece 1 of the data access unit 131 is downloaded from the data server 102-1 of a URL 1, and the encrypted decomposition piece 2 of the data access unit 131 is downloaded from the data server 102-2 of a URL 2 through the download processing part 122A1 (FIG. 16 Step S5) and passed to the synthesis processing part 122A5. For the drawing convenience of FIG. 16, the encrypted decomposition piece 1 and the encrypted decomposition piece 2 are directly input to the composition processing part 122A5, but these are passed through the download processing part 122A1.

Each encrypted decomposition piece 1 and encrypted decomposition piece 2 are combined to the encrypted data access unit 131 in an integrated encryption state by the composition processing part 122A5 (FIG. 16 Step S71). Then, the encrypted data access unit 131 is decrypted to the decrypted data access unit 131 by the decrypting processing part 122A4 (FIG. 16 Step S7). The decrypted data access unit 131 can be executable for processing such as browsing, output and editing by the application main program module 121 (FIG. 16 Step S8).

Next, processing for decomposing the data access unit 131 under the condition of establishing authentication of the close secret code and distributing the data to a plurality of storage devices is described.

Figure 17:
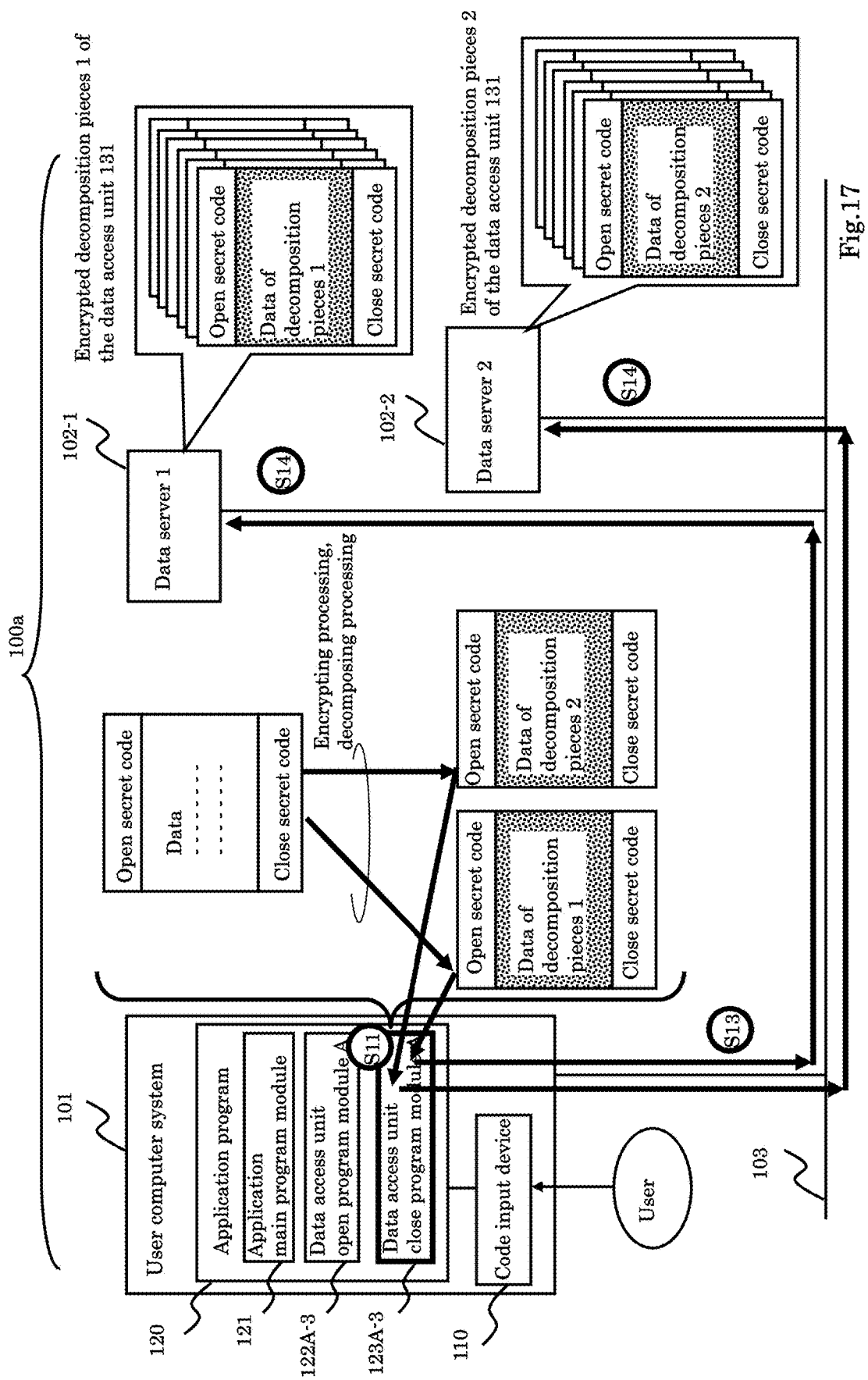
FIG. 17 is a schematic view showing the data flow of encrypting process, decomposing process, and upload process of the data access unit 131 to the plural data storage after browsing, output and editing.

FIG. 17 is a figure showing the basic flow of data to be distributed and stored in a plurality of storage devices by encrypting and decomposing the data access unit 131 after the completion of browsing, output and editing. Especially, the encryption process of the data access unit 131, decomposition process of the data access unit 131 to the decomposition piece, and upload process are shown.

The data access unit 131 is encrypted, decomposed, and the distributed and upload can be executed by the data access unit close program module 123A-3, and each encrypted decomposition piece is uploaded to each designated data server 102.

Figure 18:
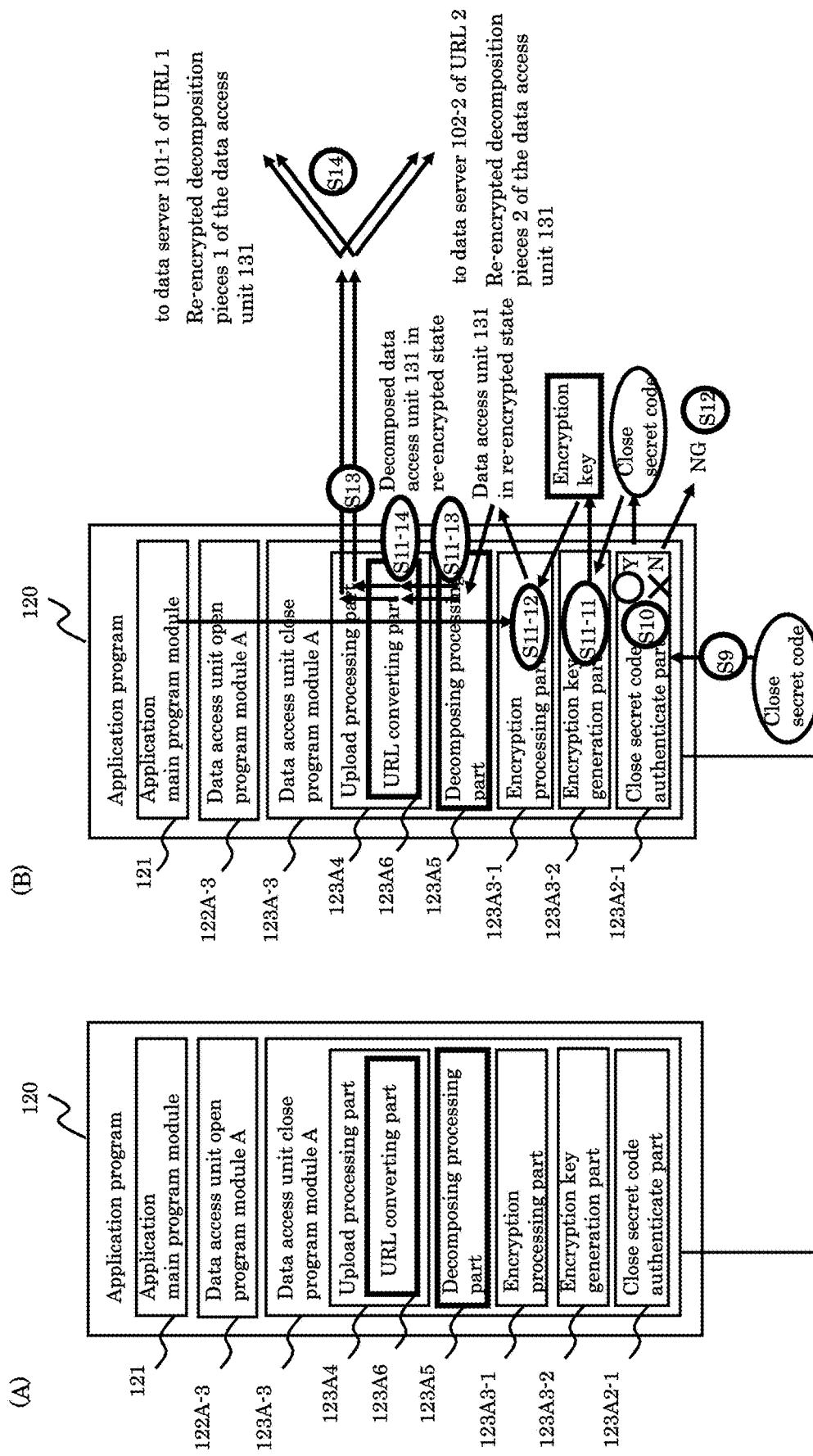
FIG. 18(A)-(B) is a schematic view showing a configuration and the data flow of the application 120 focusing on encrypting process, decomposing process, and upload process.

FIG. 18 is a figure showing the configuration of the application 120 of the data management system 100*a* and the flow of data processing of the encryption processing of the data access unit 131 associated with the input of the close secret code, the decomposition processing of the data access unit 131 to the encrypted decomposition piece, and the upload processing of the encrypted decomposition piece.

FIG. 18 (A) is a figure simply showing the configuration of data access unit close program modules 123A-3 of the application 120. A URL conversion part 123A6 in an upload processing part 123A4 and a decomposition processing part 123A5 are added in comparison with the configuration example of the embodiment 1 shown in FIG. 12 (*a*).

The URL conversion unit 123A6 is provided with a program module for converting the actual ID information and URL information inputted from the user who tries to store the data access unit 131 into each actual data servers 102-1 and the data servers 102-2 corresponding to URL information distributed on the network. That is, the user does not need to know how the data access unit 131 is decomposed and distributed, only by inputting the nominal ID information and URL information obtained the same as Example 1, and the nominal ID information and URL information are converted into URL information of each of the actual data servers 102-1 and 102-2 distributed on the network by the URL conversion part 122A6.

If the URL information by the URL conversion part 122A6 at the time of downloading described in FIG. 16 is held, and when the URL information can be re-used, the URL conversion by the URL conversion part 123A6 is not required in this case.

The decomposition processing unit 123A5 executes processing for decomposing the data access unit 131 in the encrypted state into a plurality of encrypted decomposition pieces by a predetermined decomposition algorithm. In this Embodiment 2, the data access unit 131 is encrypted by the encryption processing unit 123A3-1, and the data access unit 131 in the encrypted state is divided by the decomposition processing unit 123A5, but the data access unit 131 is decomposed into a plurality of pieces by the decomposition processing unit 123A5, and the decomposition pieces are encrypted by the encryption processing unit 123A3-1.

FIG. 18 (B) is a figure showing the basic flow of data processing with the encryption of the data access unit 131 associated with the input of the close secret code. The decomposition of the data access unit 131 to the encrypted decomposition piece and the upload of the encrypted decomposition piece are executed.

The close secret code, the URL and the ID information inputted in the Step S9 are processed by the close secret code authentication processing part 123A1. When the authentication processing is successful in the close secret code authentication processing part 123A1 (Step S10: Y), the close secret code is passed to the encryption key generation part 123A2-1, and the encryption key is generated (Steps S11-11). The encryption key generation unit 123A-2-1 is provided with a conversion program module or a calculation program module, and has the ability to generate an encryption key from the close secret code. The conversion program module may be non-performed, that is, the close secret code itself may be an encryption key. The generated encryption key can encrypt data as being decryptable by the decryption key generated by the decryption key generation unit 122A-2-1 from the open secret code.

The generated encryption key is passed to the encryption processing unit 123A3-1. On the other hand, the data access unit 131 whose processing such as editing is finished is passed from the application main program module 121 to the encryption processing part 123A3-1 and re-encrypted by using the encryption key in the encryption processing part 123A3-1 (Steps S11 to S12).

The data access unit 131 in the re-encrypted state is passed to the decomposition processing part 123A5 and decomposed into a plurality of encrypted decomposition pieces (Steps S11 to S13). In this example, the encrypted decomposition piece 1 and the encrypted decomposition piece 2 are generated.

A plurality of encrypted decomposition pieces are passed to the upload processing unit 123A4 and uploaded to URL of the data server 102 in which each encrypted decomposition piece converted by the URL conversion unit 123A6 is uploaded via the upload processing unit 123A4. That is, the encryption piece 1 is uploaded to the data server 102-1 of the URL 1, and the encrypted decomposition piece 2 is uploaded to the data server 102-2 of the URL 2 (Step S13).

When the authentication of the close secret code is not established (FIG. 16 and FIG. 18 Steps S10: N), the editing content of the third party who performs unauthorized access or editing is handled as the editing which is not approved by the user (FIG. 16 and FIG. 18 Step S12). When the user does not approve, the data access unit close program module 123A-3 does not transfer the re-encrypted data access unit 131 to the data access unit close program module 123B, and transmits information indicating that it is not updated, so that the data access unit close program module 123B is not changed as it is in the original data access unit 131 in the storage device 130.

Since the input mistake of the close secret code can be performed even by the authentic user, the operation of making the input of the close secret code multiple times can be permitted.

Referring back to FIG. 17, the explanation is continued. As shown in FIG. 17, the data access unit close program modules 123A-3 stores the encrypted decomposition pieces in the predetermined storage place and the storage format in each storage device 130.

Embodiment 3

In the data management system according to Embodiment 3, the data owner of the data access unit can select whether or not the data owner of the data access unit permits the use as big data for each data access unit.

The big data is a collection of data in a large amount integrated with respect to collection, selection, management and processing of data, but in recent years, analysis by using the big data is a technique effective for analysis, prediction, therapeutic effect, analysis, prediction, etc. of consumption direction and purchase behavior. The contribution to society is expected. On the other hand, in order to collect personal data, there is anxiety for the user who provides personal information. Therefore, the user of the data management system of the present invention provides the selection of the personal data which may be anonymously provided to contribute to social contribution by the user, and the other rest part is assumed to generate a request to be encrypted and hidden. In the data management system of this Embodiment 3, it is possible to provide big data to an operation subject side desired to perform various analysis and prediction by responding to the needs of the user and utilizing big data.

The data management system 100-2 of the present invention is provided with the encryption selection unit 124 as an additional program module of the application 120, in addition to the application main program module 121, the data access unit open program module 122A, and the data access unit close program module 123A. The encryption selection unit 124 has a program module of selecting and encrypting a part of the data access unit arbitrary.

Figure 19:
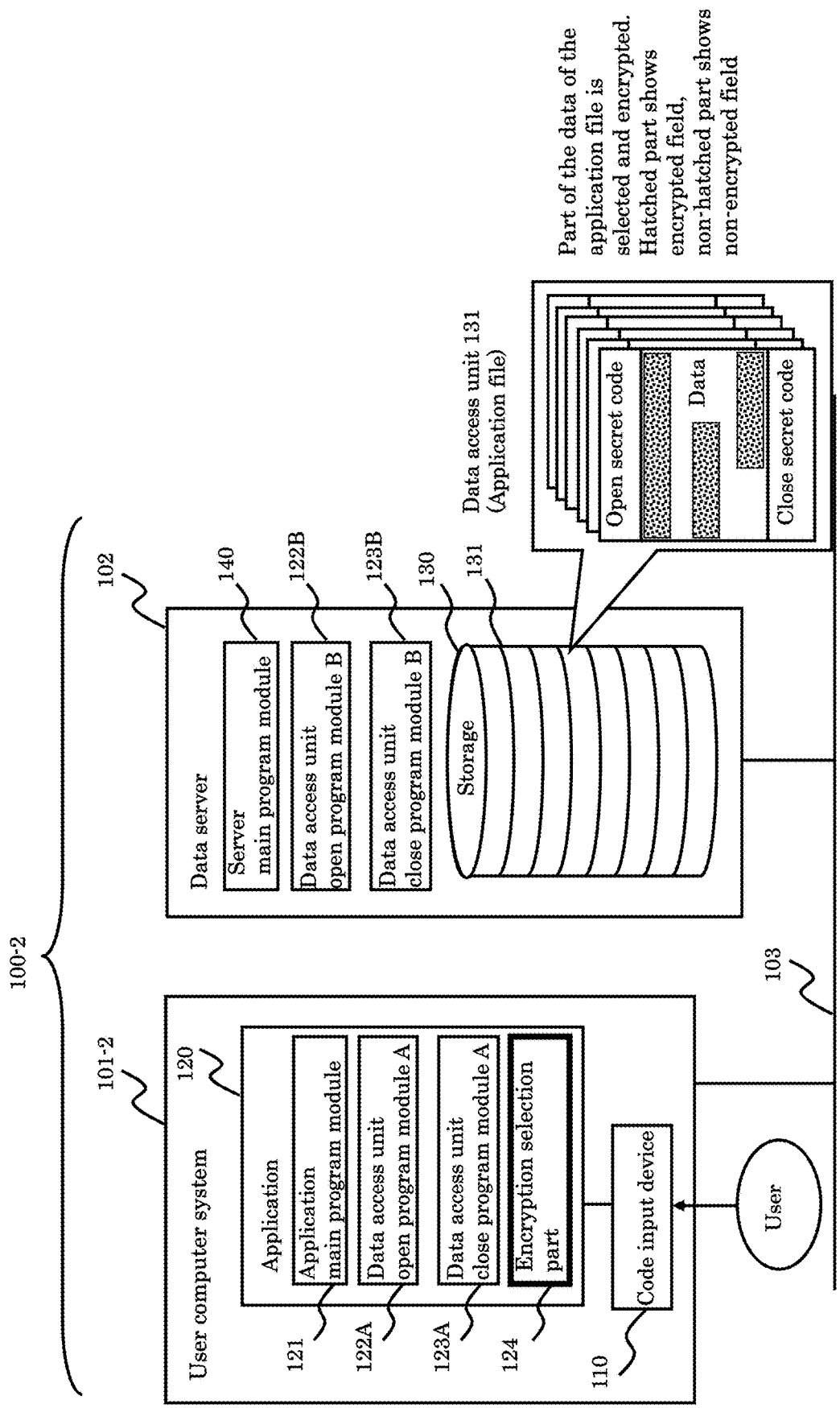
FIG. 19 is a schematic view showing a configuration of the data management system 100-2 provided with the encryption selection part 124 when the data access unit is an application file.

FIG. 19 is a figure showing the configuration of the data management system 100-2 of the present invention when the data access unit is an application file. As shown in FIG. 19, the encryption selection unit 124 has a program module of selectively encrypting a part of the application file that is the data access unit 131. In FIG. 19, the network hanging part in the application file is encrypted, and the rest unencrypted part is a non-encrypted part.

For the data part in the application file in which the encryption is not selected by the encryption selection part 124, the management subject of the data server for managing the storage device 130 can be browsed or used as the data of the big data.

Figure 20:
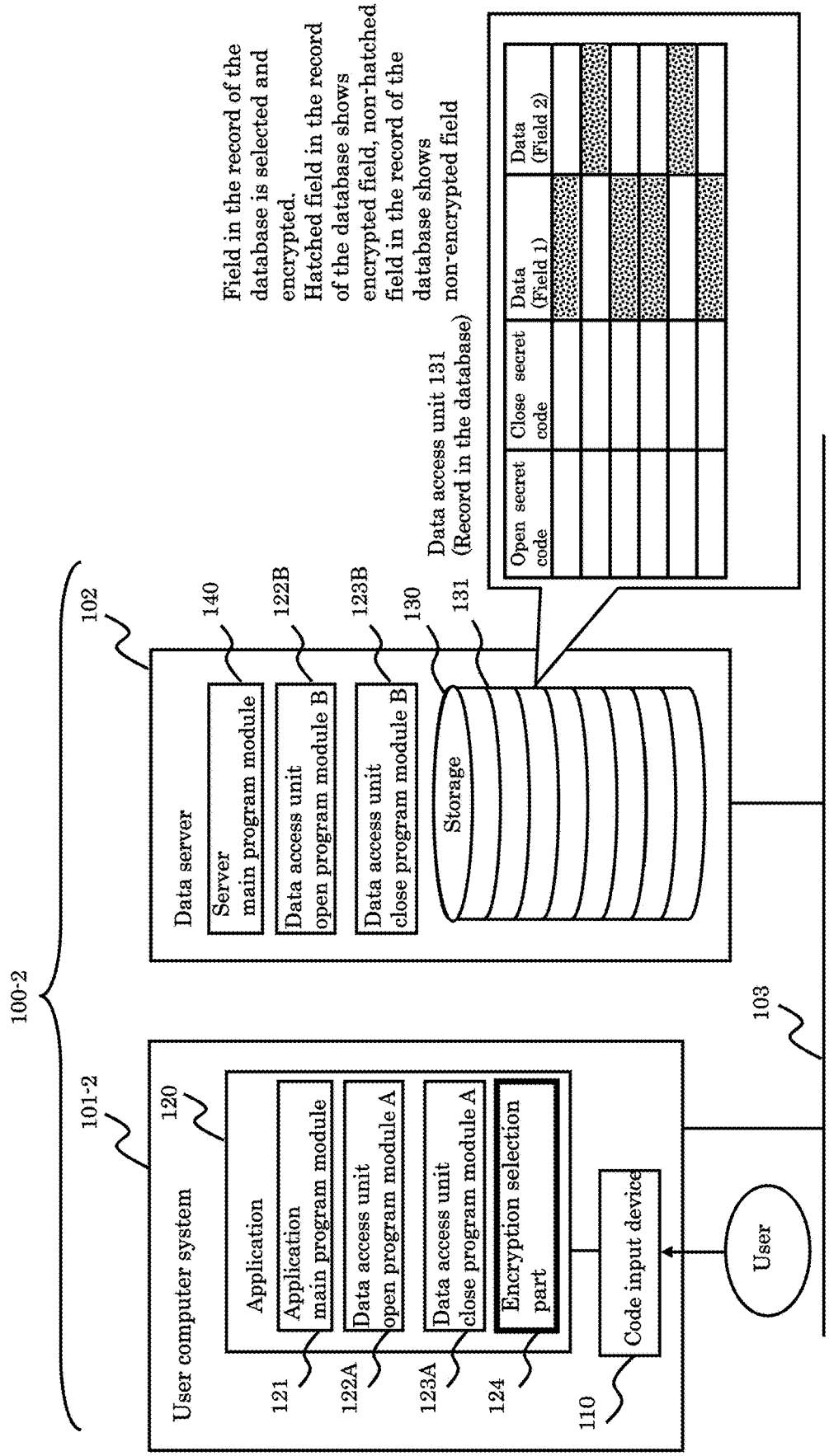
FIG. 20 is a schematic view showing a configuration of the data management system 100-2 provided with the encryption selection part 124 when the data access unit is a record of the data base.

FIG. 20 is a figure showing a configuration of the data management system 100-2 of the present invention when the data access unit is the record of a database. As shown in FIG. 20, the encryption selection unit 124 has a program module of selectively encrypting a field in a record of a database that is the data access unit 131. In FIG. 20, hatched field in the record of the database shows encrypted field, and non-hatched field in the record of the database shows non-encrypted field.

For the field part in the record of the database where the encryption is not selected by the encryption selection part 124, the management subject of the data server for managing the storage device 130 can be browsed or used as the data of the big data.

As an example of the operation, the data part encrypted by the data access unit 131 rejects the use as the big data, that is, the data part where the encryption is not selected is the operation that the data owner or the user agrees with the use of the big data.

According to the data management system 100 according to the present invention, an application file, a record in a database, a field of a record in a database or the like can be used as the data access unit, and various system operations can be performed.

Authentication of the open secret code when the data access unit is opened, browsing, output and editing of the data access unit are completed, and high security setting is made possible by the authentication of the close secret code when closing the data access unit, and the user can confirm that the input content and the operation content are correct. In addition, the open secret code is used for decoding the decryption key, the encrypted data access unit can be decrypt and decoded. The encryption processing is automatically executed as the open secret code becoming the decryption key at the closing processing.

A storage device, When the data server is constructed on the data server as computer resources different from the user computer system to be accessed by automatically processing the encryption and decryption, the data access unit can be held in an encrypted state at all times in the storage device, and even if there is leakage of data by unauthorized access, the data is always encrypted, so that substantial data leakage damage can be prevented because the user's personal information or the like is not easily decrypted.

INDUSTRIAL APPLICABILITY

The present invention can be widely applied to a computer system for handling data, and its use is not limited and can be used for a variety of business systems.

DESCRIPTION OF THE REFERENCE NUMERALS

100 Data management system
101 User computer system
102 Computer system (data server)
103 Network
110 Code input device
120 Application
121 Main program module of the application
122A and 122B Data access unit open program module
123A and 123B Data access unit close program module
124 Encryption selection unit
130 Storage device
131 Data access unit
140 Server main program module

I claim:

1. A data management system, comprising:
   an application program that can be used in a computer system;
   a code input device;
   a data access unit accessed by the application program and serving as a unit of browsing, output or editing, including an open secret code for browsing, outputting or editing the data access unit, and a close secret code for normally ending the application program for browsing, outputting or editing the data access unit;
   a storage device on a network in which a plurality of data access units are stored in a state in which all or at least a selected part is encrypted;
   a data access unit open program module for downloading the data access unit in the encrypted state targeted by the application program, and decrypting the data access unit to be able to access for browsing, outputting or editing on the basis of authentication of the open secret code for each data access unit which is inputted through the code input device;
   a data access unit close program module for closing the data access unit for ending browsing, outputting or editing, and encrypting the data access unit, and uploads the data access unit to the storage device on the basis of authentication of the close secret code for each data access unit which is inputted through the code input device.

2. The data management system according to claim 1, wherein the storage device is configured on a data server of different computer resources via the network from the computer system and the application program, and in the storage device, all or at least a selected portion of the data access unit is always held in the encrypted state, and the download and the upload are performed in an encrypted state through the network.

3. The data management system according to claim 1, wherein the encrypted state for each data access unit uploaded to the storage device is encrypted in an encrypted state as the open secret code itself or a key obtained by converting the open secret code is a decryption key.

4. The data management system according to claim 1, further comprising:
   a decryption key storage unit for storing a decryption key for the data access unit in the encrypted state accessed by the application program,
   wherein each data access unit stored in the storage device is encrypted in an encrypted state with the key obtained from the decryption key storage unit on the basis of the authentication of the open secret code is the decryption key.

5. The data management system according to claim 1, wherein the open secret code and the close secret code are unique for each data access unit.

6. The data management system according to claim 5, wherein the open secret code and the close secret code are the same code.

7. The data management system according to claim 1, wherein the open secret code and the close secret code are biological information, and the code input device is a reading device for the biological information.

8. The data management system according to claim 1, wherein the data access unit is an application file handled by the application program.

9. The data management system according to claim 8, further comprising:
   an encryption selection unit for selecting a portion to be encrypted among the data in the application file that is the data access unit,
   wherein data portion in the application file in which the encryption selection unit does not select the encryption, can be used as data capable of browsing by a management entity of the storage device or capable of use in a big data system.

10. The data management system according to claim 1, wherein the data access unit is a record in a database handled by the application program.

11. The data management system according to claim 10, further comprising:
   an encryption selection unit for selecting a portion to be encrypted among the data in a field unit in the record that is the data access unit,
   wherein data portion in field unit in the record in which the encryption selection unit does not select the encryption, can be used as data capable of browsing by a management entity of the storage device or capable of use in a big data system.

12. The data management system according to claim 1, wherein the data access unit is a field of a record in a database handled by the application program.

13. The data management system according to claim 1, wherein
   the storage device is a plurality of storage devices distributed and arranged on the network,
   when the data access unit close program module receives the input of the close secret code, the data access unit close program module decomposes the completed data access unit into a plurality of pieces, encrypts each decomposition piece of data in the encryption state, and stores each encrypted decomposition piece in the storage device distributed and arranged on the network.

14. The data management system according to claim 13, wherein the data access unit open program module is provided with a URL conversion program module for converting a nominal ID information and a URL information given as the data access unit is assumed to be integrated state without being decomposed into actual set of URL information of the storage devices distributed and arranged on the network storing each encrypted decomposition piece;
   wherein the data access unit open program module downloads each of encrypted decomposition pieces based on the actual set of URL information of the storage devices which are obtained by the URL conversion program module on the basis of the nominal ID information and the URL information in the download processing, composes a set of these encrypted decomposition pieces and decrypts to a composed data access unit in the capable state for browsing, outputting and editing,
   wherein the data access unit close program module uploads and stores each encrypted decomposition pieces to the corresponding storage devices distributed and arranged on the network in the upload processing.

15. A data management method for operating each data access unit accessed by an application program that can be used in a computer system and serving as a unit of browsing, output or editing processed by the application program comprising:
   setting an open secret code and a close secret code to each data access unit, wherein the open secret code is a code for browsing, outputting, or editing the data access unit by the application program, and the close secret code is a code for normally ending the application program for browsing, outputting or editing the data access unit;
   storing a plurality of data access units in a storage device on a network in a state in which all or at least a selected part is encrypted for each data access unit,
   executing a data access unit open program module downloading the data access unit in the encrypted state targeted by the application program, decrypting the data access unit to be able to access for browsing, outputting or editing on the basis of authentication of the open secret code for each data access unit; and
   executing a data access unit close program module that closes the data access unit for ending browsing, outputting or editing, encrypts the data access unit, and uploads the data access unit to the storage device on the basis of authentication of the close secret code for each data access unit.

\* \* \* \* \*